United States Patent
Kailey et al.

(10) Patent No.: US 11,072,166 B2
(45) Date of Patent: Jul. 27, 2021

(54) SYSTEM AND METHOD OF MONITORING USAGE OF A RECORDING MATERIAL IN AN IMAGE FORMING APPARATUS

(71) Applicants: Walter F. Kailey, Frederick, CO (US); David Ward, Broomfield, CO (US)

(72) Inventors: Walter F. Kailey, Frederick, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/719,331

(22) Filed: Dec. 18, 2019

(65) Prior Publication Data

US 2021/0187940 A1 Jun. 24, 2021

(51) Int. Cl.
*B41J 2/205* (2006.01)
*B41J 2/045* (2006.01)
*B41J 2/21* (2006.01)
*B41J 2/175* (2006.01)

(52) U.S. Cl.
CPC .......... *B41J 2/0456* (2013.01); *B41J 2/17566* (2013.01); *B41J 2/2054* (2013.01); *B41J 2/2114* (2013.01); *B41J 2/2132* (2013.01); *B41J 2002/17569* (2013.01); *B41J 2002/17589* (2013.01)

(58) Field of Classification Search
CPC .............................. B41J 2/0456; B41J 2/2054
See application file for complete search history.

(56) References Cited

U.S. PATENT DOCUMENTS

| 6,068,361 A | 5/2000 | Mantell |
| 6,088,512 A | 7/2000 | Ancin et al. |
| 7,136,189 B2 | 11/2006 | Sharma et al. |
| 7,422,300 B2 | 9/2008 | Yamanobe |
| 7,480,072 B2 | 1/2009 | Roylance |
| 7,924,464 B2 | 4/2011 | Kakutani |

(Continued)

FOREIGN PATENT DOCUMENTS

| CN | 1628980 A | 6/2005 |
| EP | 2905726 A1 | 8/2015 |
| EP | 3531267 A1 | 8/2019 |

OTHER PUBLICATIONS

Robert Ulichney; The void-and-cluster method for dither array generation; Digital Equipment Corporation; Maynard, MA; http://proceedings.spiedigitallibrary.org.

(Continued)

*Primary Examiner* — Sharon Polk
(74) *Attorney, Agent, or Firm* — Duft & Bornsen, PC

(57) ABSTRACT

Systems, methods, software for monitoring usage of a recording medium in an image forming apparatus. In one embodiment, a usage monitor receives a raster image, and identifies thresholds that distinguish different intensity levels reproduced by different drop sizes of the recording material. The usage monitor identifies a set of pixel values for a block of pixels from the raster image, performs a vectorized comparison of the set of pixel values to each of the thresholds to generate sets of comparison bits, determines a number of set bits in each of the sets of comparison bits, and updates a threshold counter for each of the thresholds based on the number of set bits. The usage monitor may then compute drop counts for different drop sizes based on the threshold counter for each of the thresholds.

20 Claims, 21 Drawing Sheets

(56) References Cited

U.S. PATENT DOCUMENTS

| | | | |
|---|---|---|---|
| 9,656,463 B1 | 5/2017 | Ernst et al. | |
| 10,855,881 B1* | 12/2020 | Kailey | H04N 1/40087 |
| 2003/0043412 A1 | 3/2003 | Roylance | |
| 2010/0079811 A1 | 4/2010 | Ota | |
| 2010/0245444 A1* | 9/2010 | Asai | H04N 1/40087 |
| | | | 347/15 |
| 2014/0092441 A1 | 4/2014 | Nishizaki | |
| 2015/0220824 A1* | 8/2015 | Kikuta | H04N 1/4051 |
| | | | 358/3.05 |
| 2019/0268482 A1 | 8/2019 | Stanich et al. | |

OTHER PUBLICATIONS

T. N. Pappas et al; Measurement of printer parameters for model-based halftoning; Journal of Electronic Imaging 2(3), 193-204 (Jul. 1993).

European Search Report; Application 20210292.7-1209; dated Apr. 22, 2021.

* cited by examiner

*FIG. 7*

| | 0 | 1 | 2 | 3 | 4 | 5 | 6 | 7 | ... | n |
|---|---|---|---|---|---|---|---|---|---|---|
| 0 | PV(0,0) | PV(0,1) | PV(0,2) | PV(0,3) | PV(0,4) | PV(0,5) | PV(0,6) | PV(0,7) | ... | PV(0,n) |
| 1 | PV(1,0) | PV(1,1) | PV(1,2) | PV(1,3) | PV(1,4) | PV(1,5) | PV(1,6) | PV(1,7) | ... | PV(1,n) |
| 2 | PV(2,0) | PV(2,1) | PV(2,2) | PV(2,3) | PV(2,4) | PV(2,5) | PV(2,6) | PV(2,7) | ... | PV(2,n) |
| 3 | PV(3,0) | PV(3,1) | PV(3,2) | PV(3,3) | PV(3,4) | PV(3,5) | PV(3,6) | PV(3,7) | ... | PV(3,n) |
| 4 | PV(4,0) | PV(4,1) | PV(4,2) | PV(4,3) | PV(4,4) | PV(4,5) | PV(4,6) | PV(4,7) | ... | PV(4,n) |
| 5 | PV(5,0) | PV(5,1) | PV(5,2) | PV(5,3) | PV(5,4) | PV(5,5) | PV(5,6) | PV(5,7) | ... | PV(5,n) |
| 6 | PV(6,0) | PV(6,1) | PV(6,2) | PV(6,3) | PV(6,4) | PV(6,5) | PV(6,6) | PV(6,7) | ... | PV(6,n) |
| 7 | PV(7,0) | PV(7,1) | PV(7,2) | PV(7,3) | PV(7,4) | PV(7,5) | PV(7,6) | PV(7,7) | ... | PV(7,n) |
| | ... | ... | ... | ... | ... | ... | ... | ... | ... | ... |
| m | PV(m,0) | PV(m,1) | PV(m,2) | PV(m,3) | PV(m,4) | PV(m,5) | PV(m,6) | PV(m,7) | ... | PV(m,n) |

FIG. 8

| | 0 | 1 | 2 | 3 | 4 | 5 | 6 | 7 | | n |
|---|---|---|---|---|---|---|---|---|---|---|
| 0 | PV(0,0) | PV(0,1) | PV(0,2) | PV(0,3) | PV(0,4) | PV(0,5) | PV(0,6) | PV(0,7) | ... | PV(0,n) |
| 1 | PV(1,0) | PV(1,1) | PV(1,2) | PV(1,3) | PV(1,4) | PV(1,5) | PV(1,6) | PV(1,7) | ... | PV(1,n) |
| 2 | PV(2,0) | PV(2,1) | PV(2,2) | PV(2,3) | PV(2,4) | PV(2,5) | PV(2,6) | PV(2,7) | ... | PV(2,n) |
| 3 | PV(3,0) | PV(3,1) | PV(3,2) | PV(3,3) | PV(3,4) | PV(3,5) | PV(3,6) | PV(3,7) | ... | PV(3,n) |
| 4 | PV(4,0) | PV(4,1) | PV(4,2) | PV(4,3) | PV(4,4) | PV(4,5) | PV(4,6) | PV(4,7) | ... | PV(4,n) |
| 5 | PV(5,0) | PV(5,1) | PV(5,2) | PV(5,3) | PV(5,4) | PV(5,5) | PV(5,6) | PV(5,7) | ... | PV(5,n) |
| 6 | PV(6,0) | PV(6,1) | PV(6,2) | PV(6,3) | PV(6,4) | PV(6,5) | PV(6,6) | PV(6,7) | ... | PV(6,n) |
| 7 | PV(7,0) | PV(7,1) | PV(7,2) | PV(7,3) | PV(7,4) | PV(7,5) | PV(7,6) | PV(7,7) | ... | PV(7,n) |
| | ... | ... | ... | ... | ... | ... | ... | ... | ... | ... |
| m | PV(m,0) | PV(m,1) | PV(m,2) | PV(m,3) | PV(m,4) | PV(m,5) | PV(m,6) | PV(m,7) | ... | PV(m,n) |

| | 0 | 1 | 2 | 3 | 4 | 5 | 6 | 7 | |
|---|---|---|---|---|---|---|---|---|---|
| 0 | LOB (0,0) | LOB (0,1) | LOB (0,2) | LOB (0,3) | LOB (0,4) | LOB (0,5) | LOB (0,6) | LOB (0,7) | ... |
| 1 | LOB (1,0) | LOB (1,1) | LOB (1,2) | LOB (1,3) | LOB (1,4) | LOB (1,5) | LOB (1,6) | LOB (1,7) | ... |
| 2 | LOB (2,0) | LOB (2,1) | LOB (2,2) | LOB (2,3) | LOB (2,4) | LOB (2,5) | LOB (2,6) | LOB (2,7) | ... |
| 3 | LOB (3,0) | LOB (3,1) | LOB (3,2) | LOB (3,3) | LOB (3,4) | LOB (3,5) | LOB (3,6) | LOB (3,7) | ... |
| 4 | LOB (4,0) | LOB (4,1) | LOB (4,2) | LOB (4,3) | LOB (4,4) | LOB (4,5) | LOB (4,6) | LOB (4,7) | ... |
| 5 | LOB (5,0) | LOB (5,1) | LOB (5,2) | LOB (5,3) | LOB (5,4) | LOB (5,5) | LOB (5,6) | LOB (5,7) | ... |
| 6 | LOB (6,0) | LOB (6,1) | LOB (6,2) | LOB (6,3) | LOB (6,4) | LOB (6,5) | LOB (6,6) | LOB (6,7) | ... |
| 7 | LOB (7,0) | LOB (7,1) | LOB (7,2) | LOB (7,3) | LOB (7,4) | LOB (7,5) | LOB (7,6) | LOB (7,7) | ... |
| | ... | ... | ... | ... | ... | ... | ... | ... | ... |

|   | 0 | 1 | 2 | 3 | 4 | 5 | 6 | 7 | |
|---|---|---|---|---|---|---|---|---|---|
| 0 | HOB LOB | HOB LOB | HOB LOB | HOB LOB | HOB LOB | HOB LOB | HOB LOB | HOB LOB | ... |
| 1 | HOB LOB | HOB LOB | HOB LOB | HOB LOB | HOB LOB | HOB LOB | HOB LOB | HOB LOB | ... |
| 2 | HOB LOB | HOB LOB | HOB LOB | HOB LOB | HOB LOB | HOB LOB | HOB LOB | HOB LOB | ... |
| 3 | HOB LOB | HOB LOB | HOB LOB | HOB LOB | HOB LOB | HOB LOB | HOB LOB | HOB LOB | ... |
| 4 | HOB LOB | HOB LOB | HOB LOB | HOB LOB | HOB LOB | HOB LOB | HOB LOB | HOB LOB | ... |
| 5 | HOB LOB | HOB LOB | HOB LOB | HOB LOB | HOB LOB | HOB LOB | HOB LOB | HOB LOB | ... |
| 6 | HOB LOB | HOB LOB | HOB LOB | HOB LOB | HOB LOB | HOB LOB | HOB LOB | HOB LOB | ... |
| 7 | HOB LOB | HOB LOB | HOB LOB | HOB LOB | HOB LOB | HOB LOB | HOB LOB | HOB LOB | ... |
|   | ... | ... | ... | ... | ... | ... | ... | ... | |

SYSTEM AND METHOD OF MONITORING USAGE OF A RECORDING MATERIAL IN AN IMAGE FORMING APPARATUS

TECHNICAL FIELD

This disclosure relates to the field of image formation, and more particularly, to monitoring the usage of a recording material.

BACKGROUND

An image forming apparatus, such as an inkjet printer or toner-based printer, is configured to print digital images that are comprised of an array of pixels. Each pixel in a digital image is represented by a pixel value indicating the intensity level of the pixel. The image forming apparatus may therefore form droplets or dots of a recording material (e.g., ink, toner, etc.) on a recording medium in varying sizes depending on the intensity levels defined by the pixel values.

SUMMARY

Provided herein are a system, method, and software for monitoring usage of a recording material in an image forming apparatus. As an overview, a system as described herein operates on a block of pixels from a raster image. The system compares pixel values for the block of pixels to thresholds that are defined to distinguish multiple intensity levels. In four-level reproduction, for instance, the system compares pixel values for the block of pixels to three thresholds. The comparison of the pixel values to the thresholds results in sets of comparison bits. For example, a comparison of the pixel values to a first threshold results in a first set of comparison bits indicating the pixel values that exceed the first threshold, a comparison of the pixel values to a second threshold results in a second set of comparison bits indicating the pixel values that exceed the second threshold, a comparison of the pixel values to a third threshold results in a third set of comparison bits indicating the pixel values that exceed the third threshold, etc. The system determines the number of "one bits" in the sets of comparison bits, and calculates a threshold count for each of the thresholds. The system may use the threshold counts for one or more blocks of pixels to determine the usage of recording material in printing a document, print job, or portion thereof, in printing multiple print jobs, etc. One technical benefit is that usage monitoring as described herein is more computationally efficient than conventional approaches.

One embodiment comprises a usage monitor that includes at least one processor, and a memory including computer program code executable by the processor. The processor causes the usage monitor to receive a raster image comprising an array of pixels, and identify thresholds that distinguish different intensity levels reproduced by different drop sizes of a recording material. For each block of one or more blocks of the pixels, the processor causes the usage monitor to identify a set of pixel values for the block of the pixels, and perform a vectorized comparison of the set of pixel values to each of the thresholds to generate sets of comparison bits. Each of the sets of comparison bits corresponds with one of the thresholds and indicates the pixel values that exceed the one of the thresholds. The processor further causes the usage monitor to determine a number of set bits in each of the sets of comparison bits, and update a threshold counter for each of the thresholds based on the number of set bits determined for a corresponding one of the sets of comparison bits. The processor further causes the usage monitor to compute drop counts for the drop sizes based on the threshold counter for each of the thresholds.

Another embodiment comprises a method of monitoring usage of a recording material. The method comprises receiving a raster image comprising an array of pixels, and identifying thresholds that distinguish different intensity levels reproduced by different drop sizes of the recording material. For each block of one or more blocks of the pixels, the method comprises identifying a set of pixel values for the block of the pixels, and performing a vectorized comparison of the set of pixel values to each of the thresholds to generate sets of comparison bits. Each of the sets of comparison bits corresponds with one of the thresholds and indicates the pixel values that exceed the one of the thresholds. The method further comprises determining a number of set bits in each of the sets of comparison bits, and updating a threshold counter for each of the thresholds based on the number of set bits determined for a corresponding one of the sets of comparison bits. The method further comprises computing drop counts for the drop sizes based on the threshold counter for each of the thresholds.

Another embodiment comprises a non-transitory computer readable medium embodying programmed instructions which, when executed by a processor, are operable for performing a method of monitoring usage of a recording material. The method comprises receiving a raster image comprising an array of pixels, and identifying thresholds that distinguish different intensity levels reproduced by different drop sizes of the recording material. For each block of one or more blocks of the pixels, the method comprises identifying a set of pixel values for the block of the pixels, and performing a vectorized comparison of the set of pixel values to each of the thresholds to generate sets of comparison bits. Each of the sets of comparison bits corresponds with one of the thresholds and indicates the pixel values that exceed the one of the thresholds. The method further comprises determining a number of set bits in each of the sets of comparison bits, and updating a threshold counter for each of the thresholds based on the number of set bits determined for a corresponding one of the sets of comparison bits. The method further comprises computing drop counts for the drop sizes based on the threshold counter for each of the thresholds.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 7 illustrates a raster image that includes an array of pixels arranged in rows and columns.

FIG. 8 illustrates a block of pixels in a raster image in an illustrative embodiment.

FIG. 18 illustrates a halftoned image with bit planes merged in an illustrative embodiment.

DETAILED DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
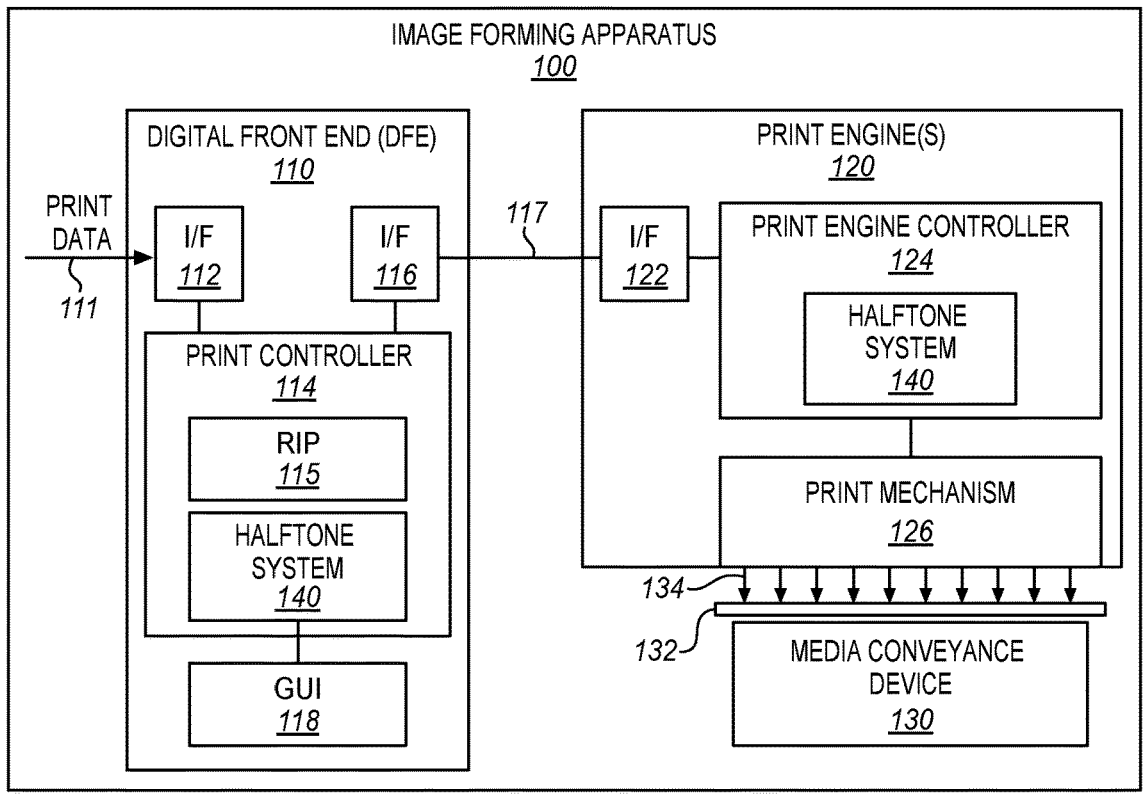
FIG. 1 is a schematic diagram of an image forming apparatus in an illustrative embodiment.

FIG. 1 is a schematic diagram of an image forming apparatus 100 in an illustrative embodiment. Image forming apparatus 100 is a type of device that executes an image forming process (e.g., printing) on a recording medium 132. Image forming apparatus 100 may comprise a continuous-form printer that prints on a web of continuous-form media, such as paper. Although a continuous-form printer is discussed, concepts described herein may also apply to alternative print systems, such as cut-sheet printers, wide format printers, 3D printers, etc.

In this embodiment, image forming apparatus 100 includes a Digital Front End (DFE) 110, one or more print engines 120, and a media conveyance device 130. DFE 110 comprises a device, circuitry, and/or other component configured to accept print data 111, and convert the print data 111 into a suitable format for print engine 120. DFE 110 includes an Input/Output (I/O) interface 112, a print controller 114, a print engine interface 116, and a Graphical User Interface (GUI) 118. I/O interface 112 comprises a device, circuitry, and/or other component configured to receive print data 111 from a source. For example, I/O interface 112 may receive the print data 111 from a host system (not shown), such as a personal computer, a server, etc., over a network connection, may receive print data 111 from an external memory, etc. Thus, I/O interface 112 may be considered a network interface in some embodiments. The print data 111 comprises a file, document, print job, etc., that is formatted with a Page Description Language (PDL), such as PostScript, Printer Command Language (PCL), Intelligent Printer Data Stream (IPDS), etc. Print controller 114 comprises a device, circuitry, and/or other component configured to transform the print data 111 into one or more digital images that may be used by print engine 120 to mark a recording medium 132 with ink, toner, or another recording material. Thus, print controller 114 includes a Raster Image Processor (RIP) 115 that rasterizes the print data 111 to generate digital images. A digital image comprises a two-dimensional array of pixels. Whereas the print data 111 in PDL format is a high-level description of the content (e.g., text, graphics, pictures, etc.), a digital image defines a pixel value or color value for each pixel in a display space. Print engine interface 116 comprises a device, circuitry, and/or other component configured to communicate with print engine 120, such as to transmit digital images to print engine 120. Print engine interface 116 is communicatively coupled to print engine 120 via a communication link 117 (e.g., a fiber link, a bus, etc.), and is configured to use a data transfer protocol to transfer the digital images to print engine 120. GUI 118 is a hardware component configured to interact with a human operator. GUI 118 may include a display, screen, touch screen, or the like (e.g., a Liquid Crystal Display (LCD), a Light Emitting Diode (LED) display, etc.). GUI 118 may include a keyboard or keypad, a tracking device (e.g., a trackball or trackpad), a speaker, a microphone, etc. A human operator may access GUI 118 to view status indicators, view or manipulate settings, schedule print jobs, etc.

Print engine 120 includes a DFE interface 122, a print engine controller 124, and a print mechanism 126. DFE interface 122 comprises a device, circuitry, and/or other component configured to interact with DFE 110, such as to receive digital images from DFE 110. Print engine controller 124 comprises a device, circuitry, and/or other component configured to process the digital images received from DFE 110, and provide control signals to print mechanism 126. Print mechanism 126 is a device or devices that mark the recording medium 132 with a recording material 134, such as ink, toner, etc. Print mechanism 126 is configured for variable droplet or dot size to reproduce multiple intensity levels, as opposed to a bi-level mechanism where a pixel is either "on" or "off". For example, if print mechanism 126 is an ink-jet device, then multiple intensity levels per pixel may be achieved by printing one, two, or several droplets at the same position, or varying the size of a droplet. Recording medium 132 comprises any type of material suitable for printing upon which recording material 134 is applied, such as paper (web or cut-sheet), plastic, card stock, transparent sheets, a substrate for 3D printing, cloth, etc. In one embodiment, print mechanism 126 may include one or more printheads that are configured to jet or eject droplets of a print fluid, such as ink (e.g., water, solvent, oil, or UV-curable), through a plurality of orifices or nozzles. The orifices or nozzles may be grouped according to ink types (e.g., colors such as Cyan (C), Magenta (M), Yellow (Y), Key black (K) or formulas such as for pre-coat, image and protector coat), which may be referred to as color planes. In another embodiment, print mechanism 126 may include a drum that selectively collects electrically-charged powdered ink (toner), and transfers the toner to recording medium 132. Media conveyance device 130 is configured to move recording medium 132 relative to print mechanism 126. In other embodiments, portions of print mechanism 126 may be configured to move relative to recording medium 132.

Image forming apparatus 100 may include various other components not specifically illustrated in FIG. 1.

When RIP 115 rasterizes the print data 111, the output is a digital continuous tone image where individual pixels are defined with pixel values that are relatively large. For example, the digital continuous tone image may have 8-bit pixel values or larger. A digital continuous tone image generated by RIP 115 is referred to herein as a "raster image". An 8-bit pixel value may represent 256 different intensities of a color. However, a typical print mechanism (e.g., print mechanism 126) may not be capable of reproduction at 256 different levels. Thus, a halftoning process may be performed to define the individual pixels with lower multi-bit values, such as two-bits, three-bits, etc. FIG. 1 also illustrates a halftone system 140 implemented in print controller 114. Halftone system 140 comprises circuitry, logic, hardware, and/or other components configured to perform a multi-level halftoning process on one or more raster images, which is described in further detail below. Although halftone system 140 is shown as being implemented in print controller 114 of DFE 110, halftone system 140 may be implemented in print engine controller 124 (as shown in FIG. 1), in a host system or another system coupled to image forming apparatus 100, or in other systems.

Figure 2:
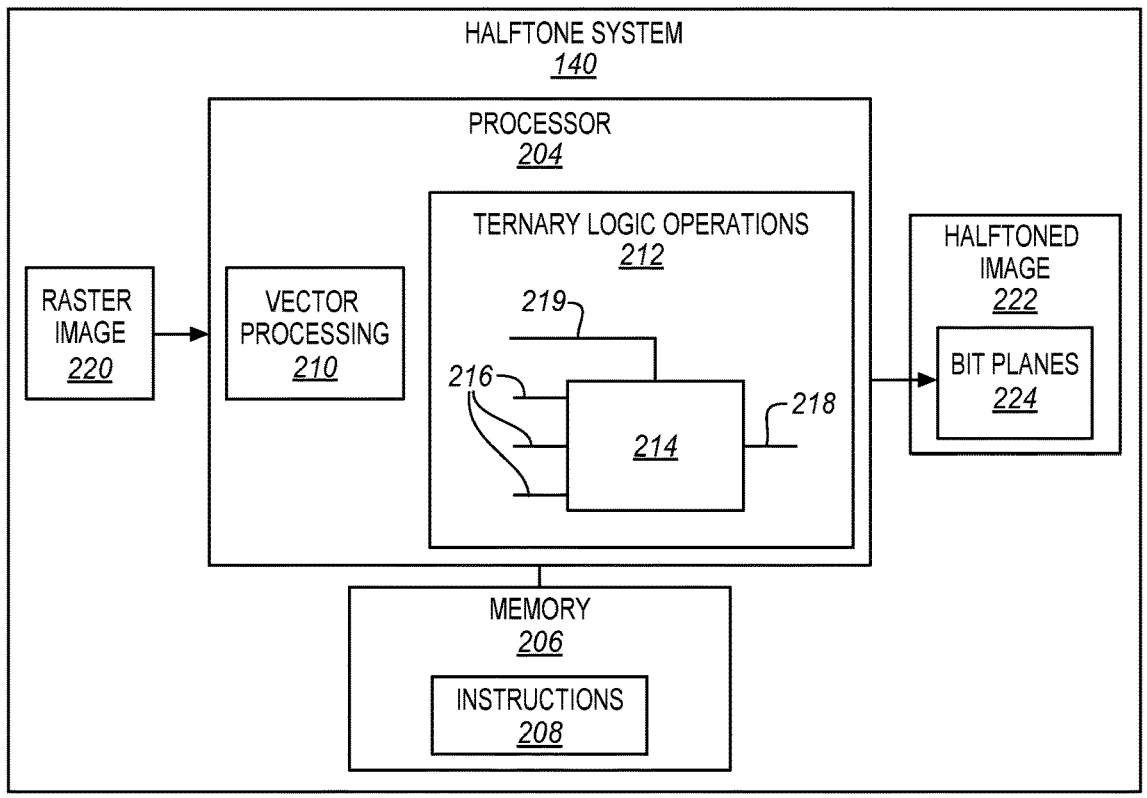
FIG. 2 is a schematic diagram of a halftone system in an illustrative embodiment.

FIG. 2 is a schematic diagram of halftone system 140 in an illustrative embodiment. Halftone system 140 includes one or more processors 204 and a memory 206. Processor 204 represents the internal circuitry, logic, hardware, etc., that provides the functions of halftone system 140. Processor 204 may be configured to execute instructions 208 (i.e., computer program code) for software that are loaded into memory 206. Processor 204 may comprise a set of one or more processors or may comprise a multi-processor core, depending on the particular implementation. Memory 206 is a computer readable storage medium for data, instructions 208, applications, etc., and is accessible by processor 204. Memory 206 is a hardware storage device capable of storing information on a temporary basis and/or a permanent basis. Memory 206 may comprise volatile or non-volatile Random-Access Memory (RAM), Read-Only Memory (ROM), FLASH devices, volatile or non-volatile Static RAM (SRAM) devices, magnetic disk drives, Solid State Disks (SSDs), or any other volatile or non-volatile storage device.

Figure 3:
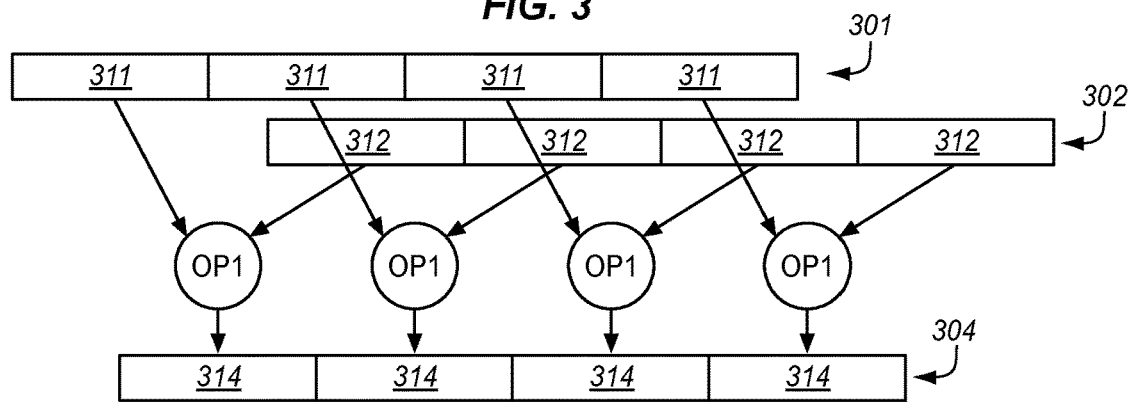
FIG. 3 illustrates a vector processing operation.

Processor 204 is configured for vector processing 210. Vector processing 210 is a type of processing that operates on sets of values called "vectors" at a time, as compared to operating on a single value. FIG. 3 illustrates a vector processing operation. Processor 204, for example, receives two vectors 301-302 as input; each one with a set of operands. Vector 301 includes a set of operands 311, and vector 302 includes a set of operands 312. Processor 204 is able to perform the same operation (OP1) on both sets of operands 311 and 312 (one operand from each vector) at a time, and outputs a vector 304 with the results 314. Processor 204 may have a variety of architectures that allow for vector processing 210, such as a Central Processing Unit (CPU) or a Graphics Processing Unit (GPU) that use a Single Instruction Multiple Data (SIMD) paradigm. In a SIMD paradigm, a single instruction is executed in parallel on multiple data points.

Figure 4:
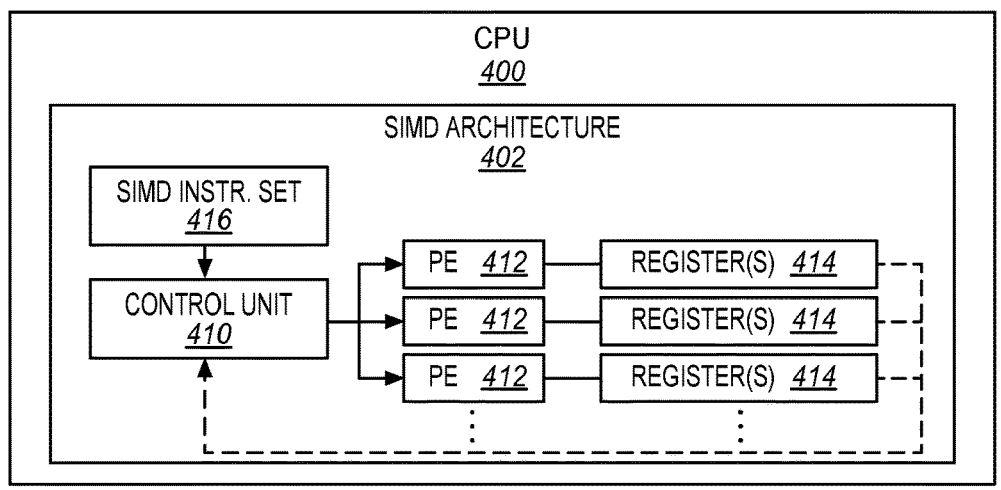
FIGS. 4-5 illustrate a CPU and a GPU that perform SIMD operations.
Figure 5:
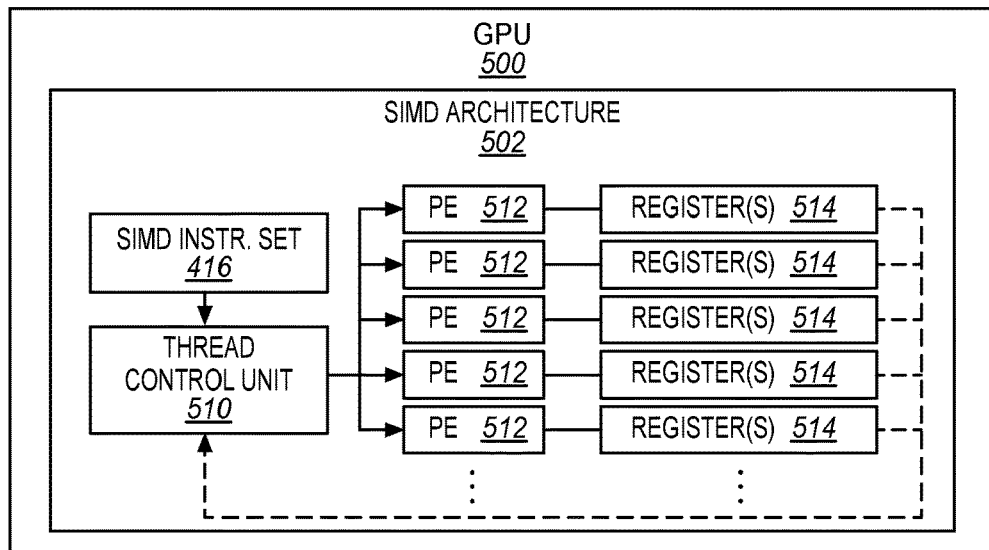

FIGS. 4-5 illustrate a CPU 400 and a GPU 500, respectively, that perform SIMD operations. CPU 400 includes a SIMD architecture 402, which includes a control unit 410, and one or more processing clusters that include multiple processing elements (PE) 412 (e.g., Arithmetic Logic Units (ALUs)) and corresponding registers 414 (also referred to as memory modules (MM)). Although three processing elements 412 are illustrated in this example, more or less processing elements may be used in other examples. Control unit 410 is configured to fetch or retrieve a SIMD instruction set 416, and issue instructions to the PEs 412 from the instruction set 416 for a clock cycle. Control unit 410 is also configured to manage data fetching, and data storage. PEs 412 represent the computational resources that perform operations based on instructions from control unit 410. Registers 414 are configured to temporarily store data for operations performed by PEs 412. For example, registers 414 may be 64-bits wide, 128-bits wide, 256-bits wide, 512-bits wide, etc. Control unit 410 may also manage processes for loading data into registers 414. GPU 500 (see FIG. 5) includes a SIMD architecture 502, which includes a thread control unit 510, and one or more processing clusters that include multiple PEs 512 and corresponding registers 514. It is noted that FIGS. 4-5 illustrate a basic structure of a CPU 400 and a GPU 500 for SIMD operations, and other structures are considered herein.

In FIG. 2, processor 204 is also configured for ternary logic operations 212. Ternary logic is a function which maps three input Boolean values (or "bits") to a single output bit. Processor 204 may include a ternary logic subsystem 214 that includes three inputs 216 and one output 218. Ternary logic subsystem 214 may be configured to perform a plurality of ternary logic functions. For example, there may be $256$ ($2^8$) possible ternary logic functions defined. To select between the ternary logic functions, ternary logic subsystem 214 further includes a selector parameter 219 (e.g., an 8-bit code) that is used to select a desired ternary logic function for a given set of inputs 216. CPU 400 and/or GPU 500 as discussed above may provide machine level instructions to implement ternary logic in this manner.

As a general overview of a multi-level halftoning process, halftone system 140 receives a raster image 220 as input, and converts the raster image 220 to a multi-bit halftoned image 222 that indicates pixel values with fewer bits than the raster image 220. Halftone system 140 iterates over one or more blocks of pixels from the raster image 220 for a color plane to compare sets of pixel values from the raster image 220 to thresholds that are defined to distinguish the different intensity levels. A comparison of a set of pixel values with a threshold results in a corresponding set of comparison bits. Ternary logic operations 212 are then performed on the comparison bits to generate bit planes 224 for the pixels.

Each bit plane 224 represents one of the bits for the pixels. For example, a first bit plane represents the low-order bits of the pixels, a second bit plane represents higher-order bits of the pixels, etc. The bit planes 224, in combination, represent the multi-bit halftoned image 222.

Figure 6A:
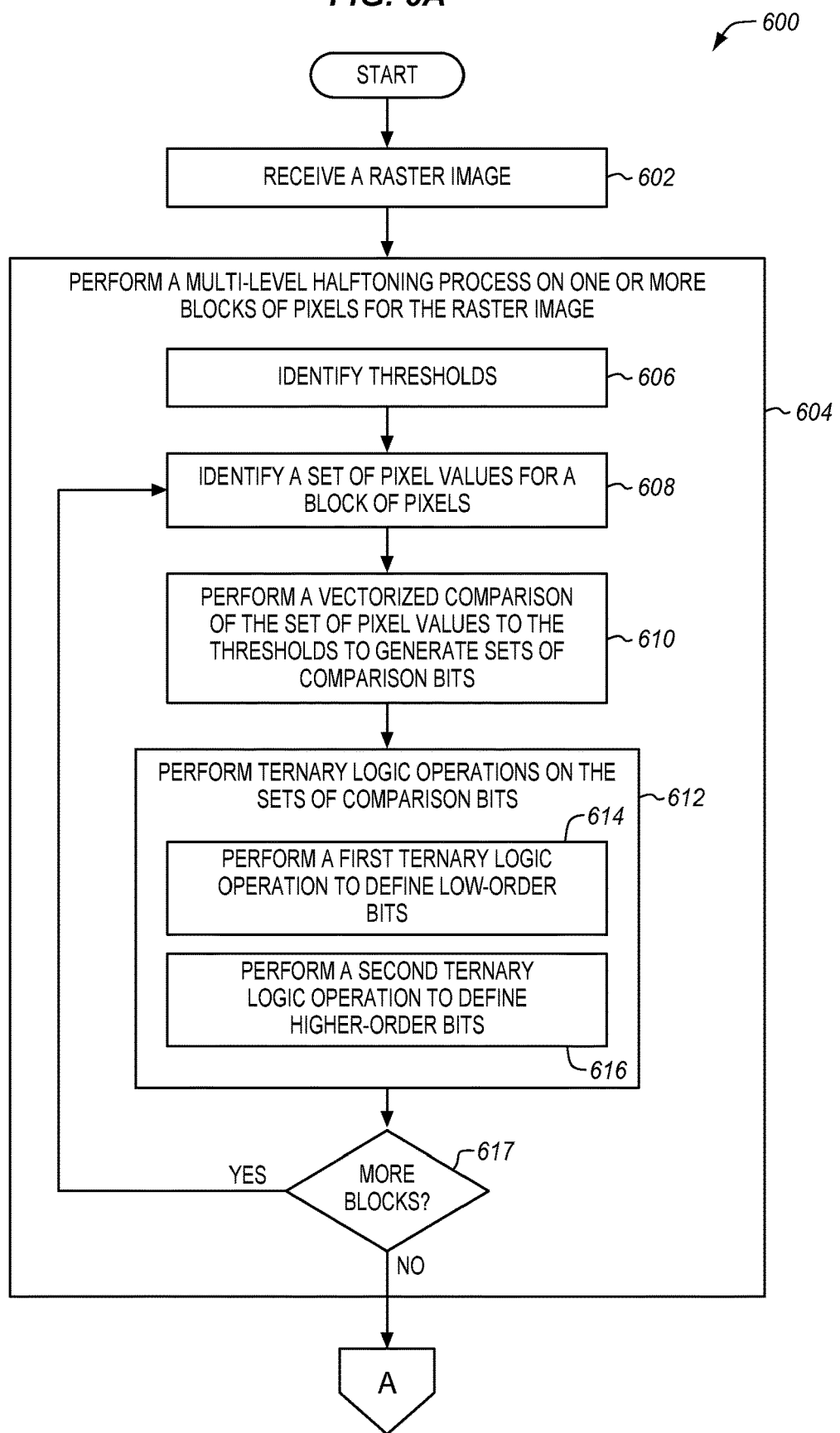
FIGS. 6A-6B depict a flowchart illustrating a method of halftoning in an illustrative embodiment.
Figure 6B:
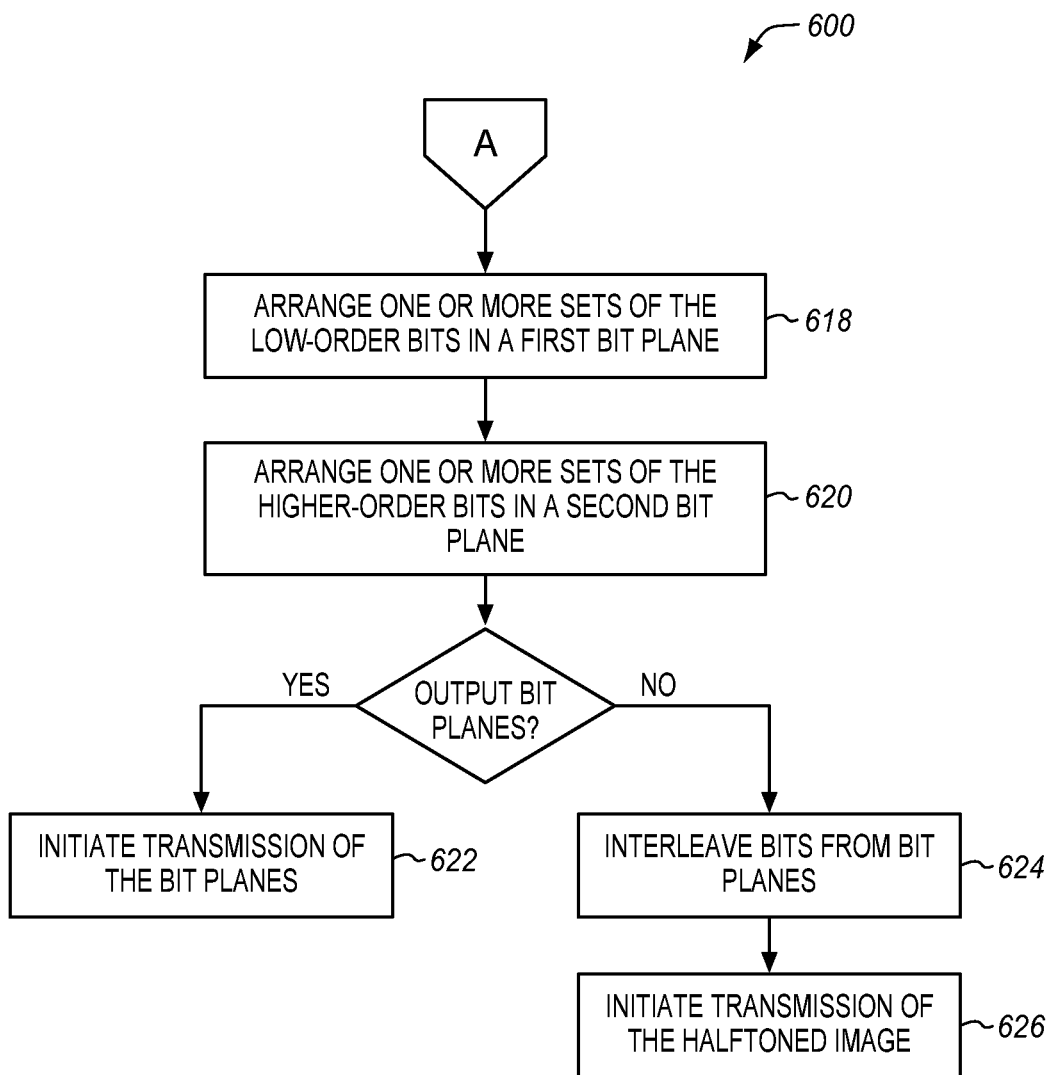

FIGS. 6A-6B depict a flowchart illustrating a method 600 of halftoning in an illustrative embodiment. The steps of method 600 are described with reference to halftone system 140 in FIG. 2, but those skilled in the art will appreciate that method 600 may be performed with other systems. The steps of the flowcharts described herein are not all inclusive and may include other steps not shown. The steps described herein may also be performed in an alternative order.

In FIG. 6A, processor 204 receives a raster image 220 (step 602) for a color plane, such as generated by RIP 115. FIG. 7 illustrates a raster image 220. Raster image 220 is a data structure that represents an array of pixels 702 with multi-bit pixel values (PV). The pixels are arranged in rows 710 and columns 711. There are "m+1" number of rows 710, and "n+1" number of columns 711. For illustrative purposes, each pixel 702 is noted with a (row,column) identifier (e.g., "(0,0)"). Each pixel 702 has an associated pixel value PV that is defined by x-bits, such as 8-bits, 16-bits, etc. For example, if the pixel values are 8-bit, then each pixel 702 may have any value between 0-255 (decimal). Raster image 220 is for a single color plane, such as Cyan (C), Magenta (M), Yellow (Y), or Key black (K).

In FIG. 6A, processor 204 performs a multi-level halftoning process on one or more blocks of pixels 702 for raster image 220 (step 604). A multi-level halftoning process produces output that defines pixel values in multiple bits, as opposed to a bi-level halftoning process. For example, a multi-level halftoning process may produce pixel values that are two-bits, three-bits, etc. Processor 204 may identify thresholds for multi-level reproduction (step 606). Multi-level reproduction involves multiple intensity levels, and therefore multiple thresholds that distinguish the different intensity levels. There is one less threshold than number of intensity levels. For example, a pixel represented by two bits may have four intensity levels (e.g., 00, 01, 10, 11). In this two-bit example with four intensity levels, there are three thresholds that distinguish or divide the four intensity levels. Thus, processor 204 may identify a first threshold, a second threshold, and a third threshold, such as by retrieving these thresholds from memory 206. In a two-bit example with three intensity levels, there are two thresholds that distinguish or divide the three intensity levels. In a three-bit example with eight intensity levels, there may be seven thresholds that distinguish the eight intensity levels. Processor 204 identifies the thresholds in "sets" to accommodate vector processing as described below.

Figure 9:
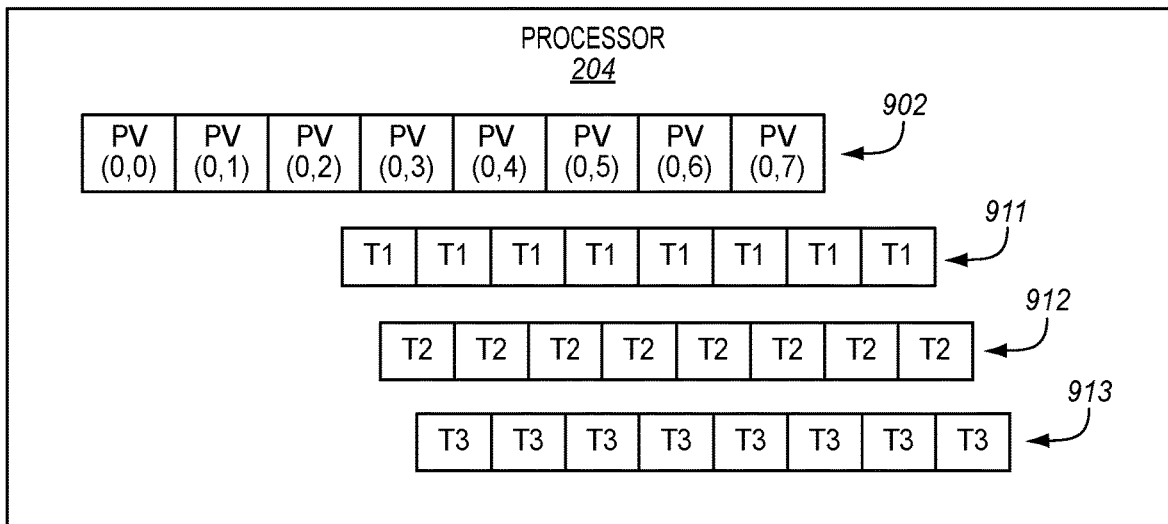
FIG. 9 is a schematic diagram of a processor with a set of pixel values for a block loaded in a local memory in an illustrative embodiment.

For the multi-level halftoning process, halftone system 140 may operate on one or more blocks of pixels at a time. Thus, processor 204 may identify a set of pixel values (PV) for pixels 702 in a block (step 608). A block of pixels 702 comprises a grouping or number of pixels that are processed at a time. A block may be a number of pixels consecutive in a row 710 of raster image 220, a number of pixels that wrap around from one row 710 to another, or another desired grouping of pixels. FIG. 8 illustrates a block 800 of pixels 702 in raster image 220 in an illustrative embodiment. In this example, block 800 includes eight pixels 702 in a single row. But as explained above, block 800 may have other numbers or groupings of pixels in other examples. Processor 204 may load the set of pixel values for block 800 in a register, a local memory, or other memory location. FIG. 9 is a schematic diagram of processor 204 with the set 902 of pixel values for block 800 loaded in a local memory in an illustrative embodiment.

Figure 10:
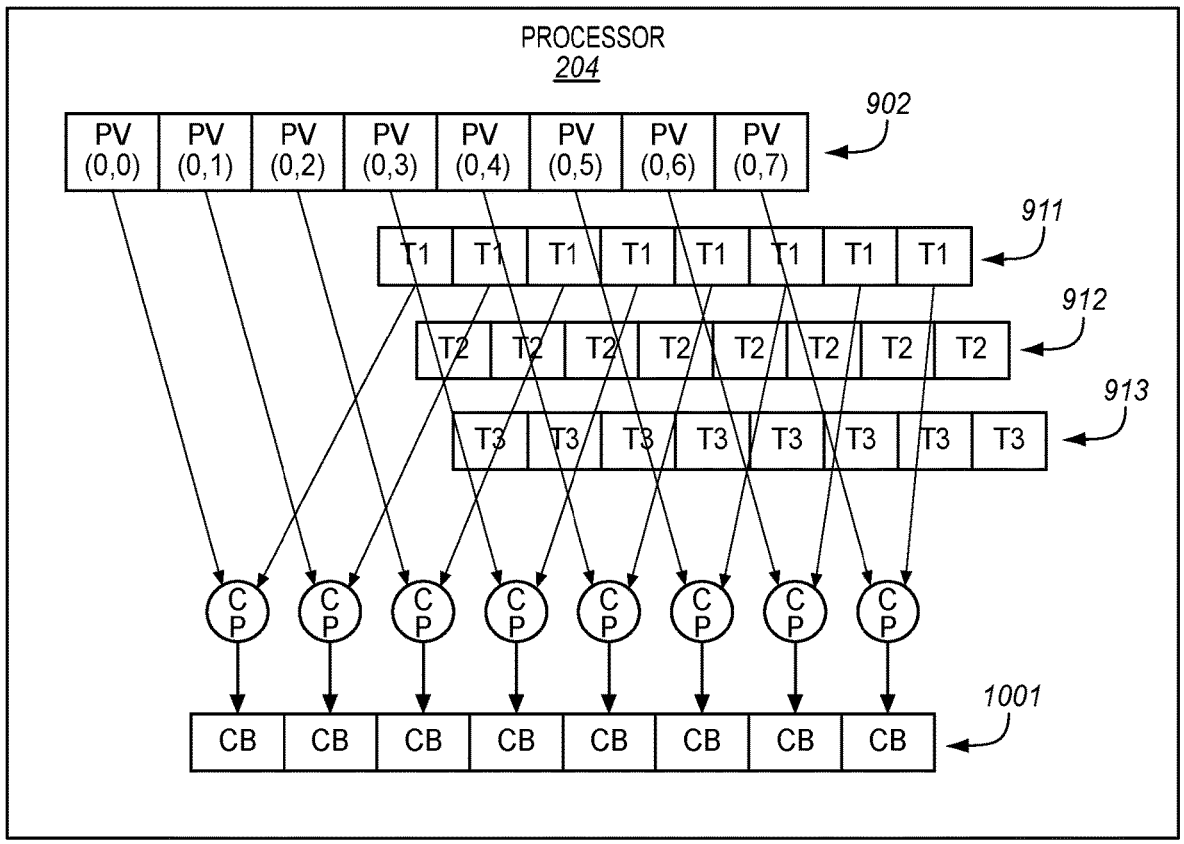
FIGS. 10-12 illustrate a vectorized comparison in an illustrative embodiment.
Figure 11:
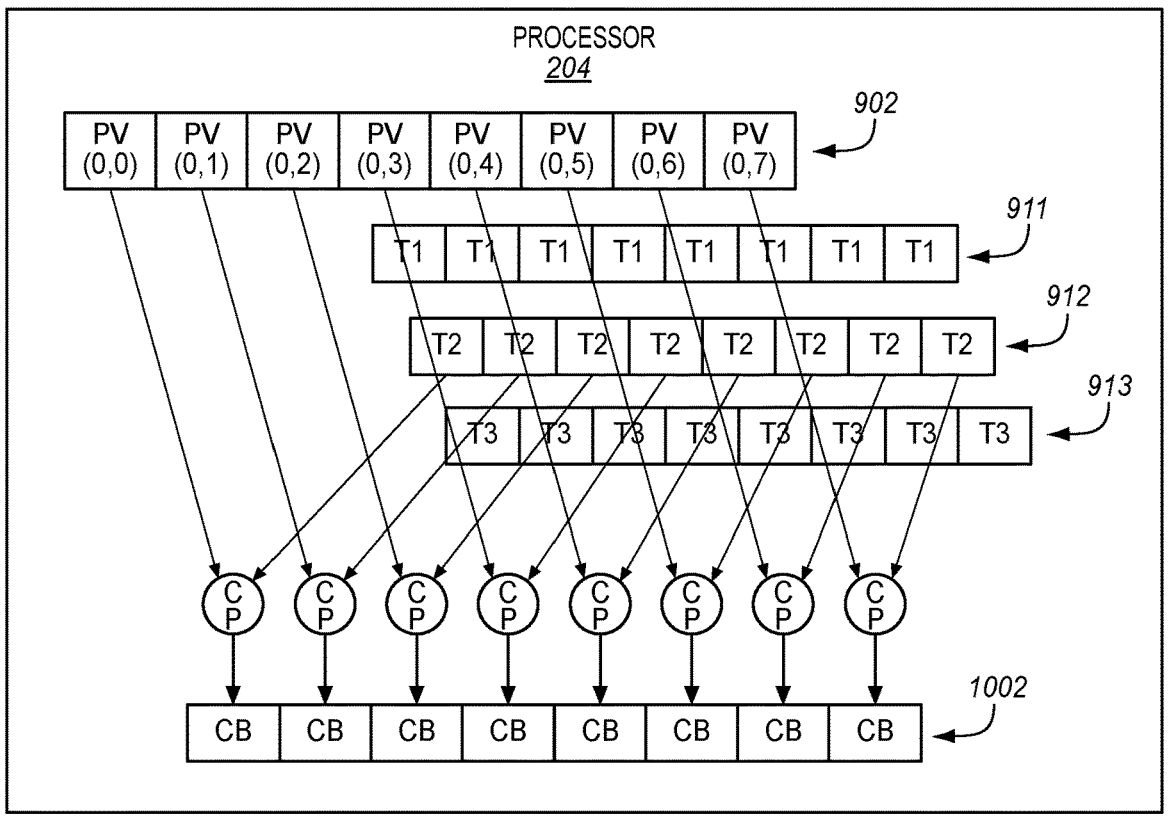
Figure 12:
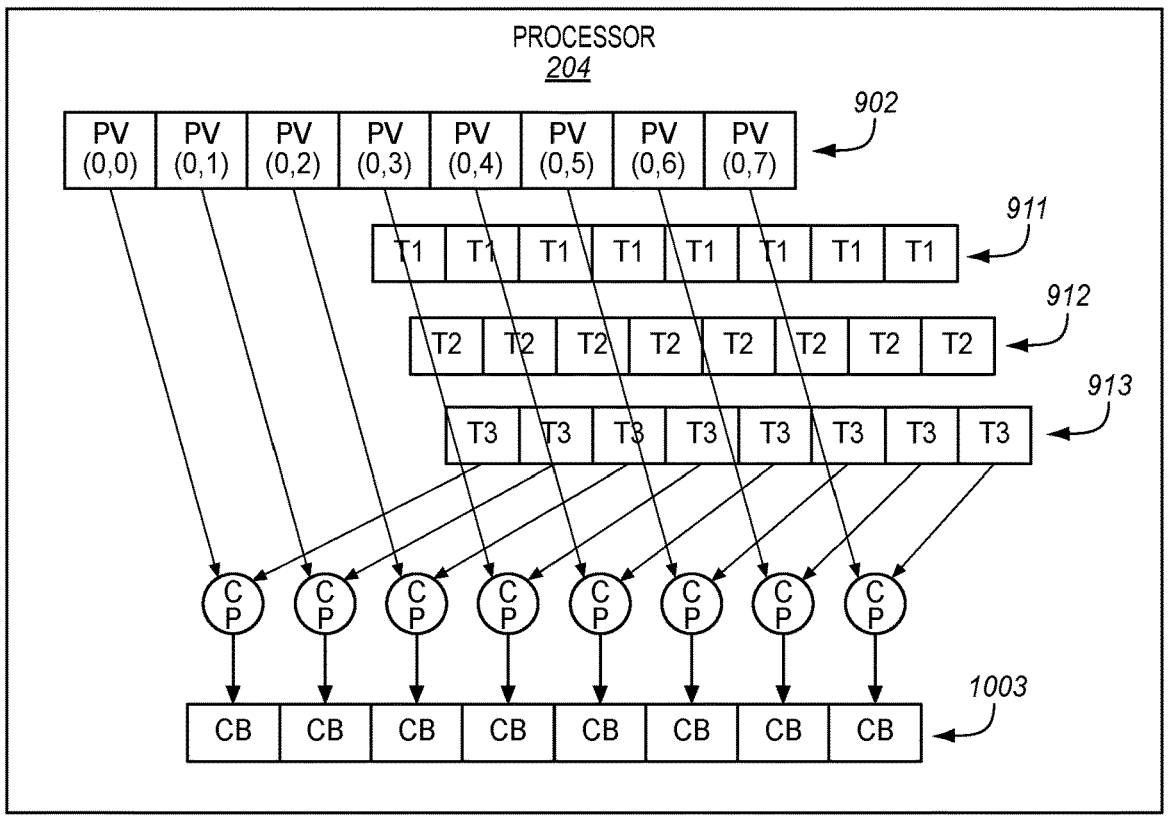

FIG. 9 further illustrates a set 911 of first thresholds (T1), a set 912 of second thresholds (T2), and a set 913 of third thresholds (T3) loaded in a local memory. In this example, the set 911 of first thresholds (T1) is used to distinguish a first intensity level and a second intensity level. The set 912 of second thresholds (T2) is used to distinguish the second intensity level and a third intensity level. The set 913 of third thresholds (T3) is used to distinguish the third intensity level and a fourth intensity level. Additional sets of thresholds may be loaded into processor 204 in cases of more than four intensity levels. In FIG. 6A, processor 204 performs a vectorized comparison of the set 902 of pixel values (PV) to the thresholds, such as in sets 911-913 (step 610). A vectorized comparison means that the set 902 of pixel values (PV) is compared to a set 911-913 of thresholds at a time (e.g., a clock cycle). The set 902 of pixel values (PV) and a set 911-913 of thresholds may be considered "vectors" where the same comparison operation is performed on both sets of values (one from each vector) at a time. It is also noted that the set 902 of pixel values (PV) may be compared to each set 911-913 of thresholds simultaneously depending on the capability of processor 204. FIGS. 10-12 illustrate a vectorized comparison in an illustrative embodiment. In FIG. 10, processor 204 performs the vectorized comparison of the set 902 of pixel values (PV) to the set 911 of first thresholds to generate a first set 1001 of comparison bits (CB). A set of comparison bits represents the result of the comparison for each pixel value and threshold. For example, if a pixel value is "220" and the threshold is "64", then the comparison bit for that pixel may be "1". If the pixel value is "50" and the threshold is "64", then the comparison bit for that pixel may be "0". Thus, a set of comparison bits corresponds with one of the thresholds and indicates the pixel values that exceed the threshold. In one embodiment, the first threshold may be for a first or smallest droplet/dot size, which means that a pixel value that exceeds the first threshold corresponds with at least the smallest droplet/dot size (i.e., the smallest droplet/dot size or a larger drop size).

In FIG. 11, processor 204 performs the vectorized comparison of the set 902 of pixel values (PV) to the set 912 of second thresholds to generate a second set 1002 of comparison bits (CB). In one embodiment, the second threshold may be for a second droplet/dot size that is larger than the first droplet/dot size, meaning that a pixel value that exceeds the second threshold corresponds with at least the second droplet/dot size (i.e., the second droplet/dot size or larger). In FIG. 12, processor 204 performs the vectorized comparison of the set 902 of pixel values (PV) to the set 913 of third thresholds to generate a third set 1003 of comparison bits (CB). In one embodiment, the third threshold may be for a third droplet/dot size that is larger than the second droplet/dot size, meaning that a pixel value that exceeds the third threshold corresponds with at least the third droplet/dot size (i.e., the third droplet/dot size or larger). Although the vectorized comparisons for the thresholds are shown in different figures, it is understood that the vectorized comparisons may be performed simultaneously within processor 204. Also, although vectorized comparisons are shown for three thresholds, processor 204 may perform vectorized comparisons for more or less thresholds depending on the number of intensity levels considered for the multi-level halftoning.

In FIG. 6A, the vectorized comparisons from step 610 result in multiple sets of comparison bits (e.g., sets 1001-

1003). For multi-level halftoning, there are three or more sets of comparison bits whenever four or more intensity (e.g., output) levels are used. Processor 204 performs ternary logic operations on the sets 1001-1003 of comparison bits (step 612). Ternary logic produces one output bit per three input bits. Thus, each one of the ternary logic operations outputs one bit of a pixel value for the halftoned image 222. For example, processor 204 may perform a first ternary logic operation (step 614) to define a low-order bit (least significant bit) of a pixel value, and a second ternary logic operation (step 616) to define the next higher-order bit of the pixel value. These ternary logic operations are performed to define the low-order bits and the higher-order bits for the pixels 702 in block 800.

Figure 13:
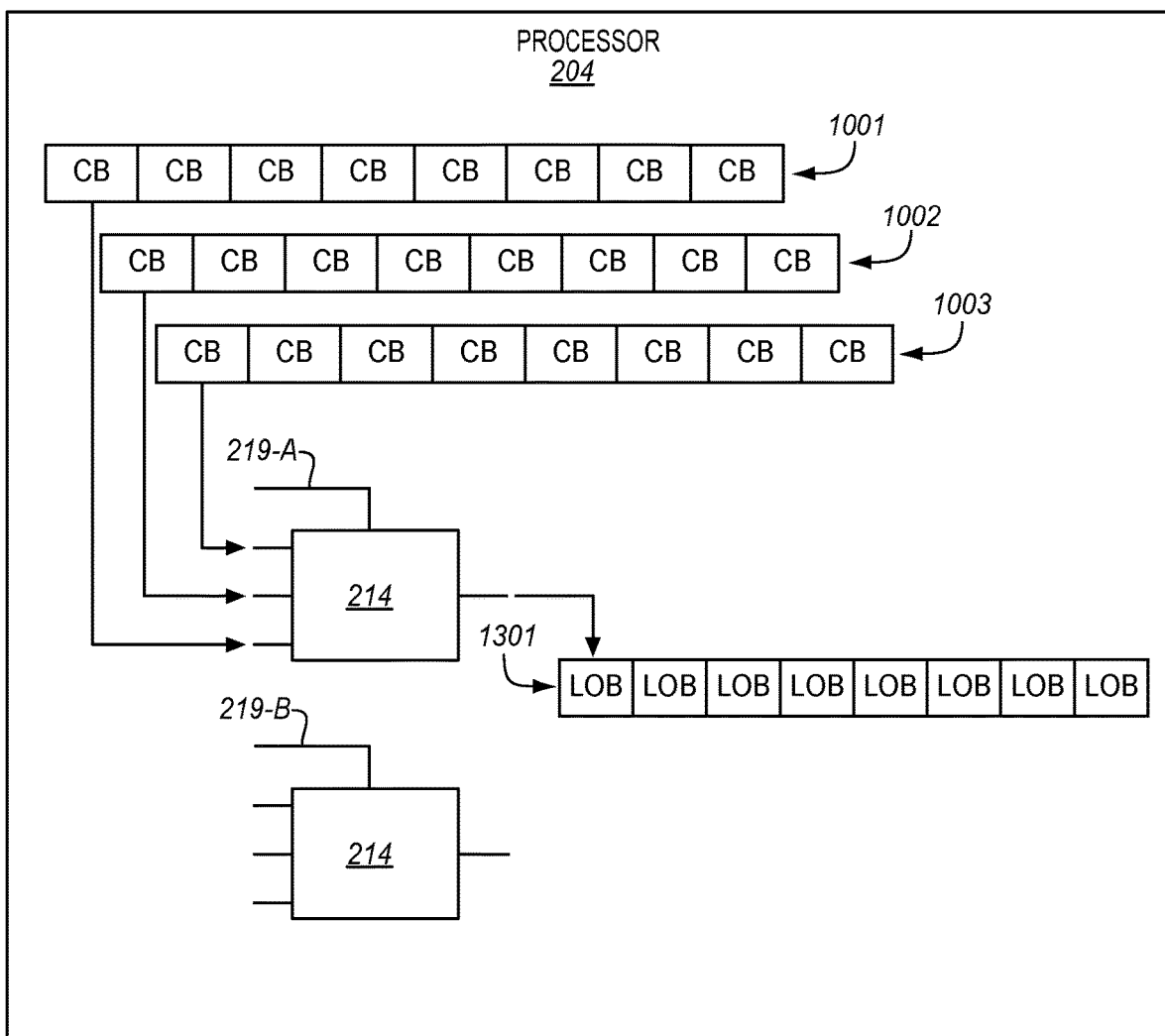
FIGS. 13-14 illustrate ternary logic operations in an illustrative embodiment.
Figure 14:
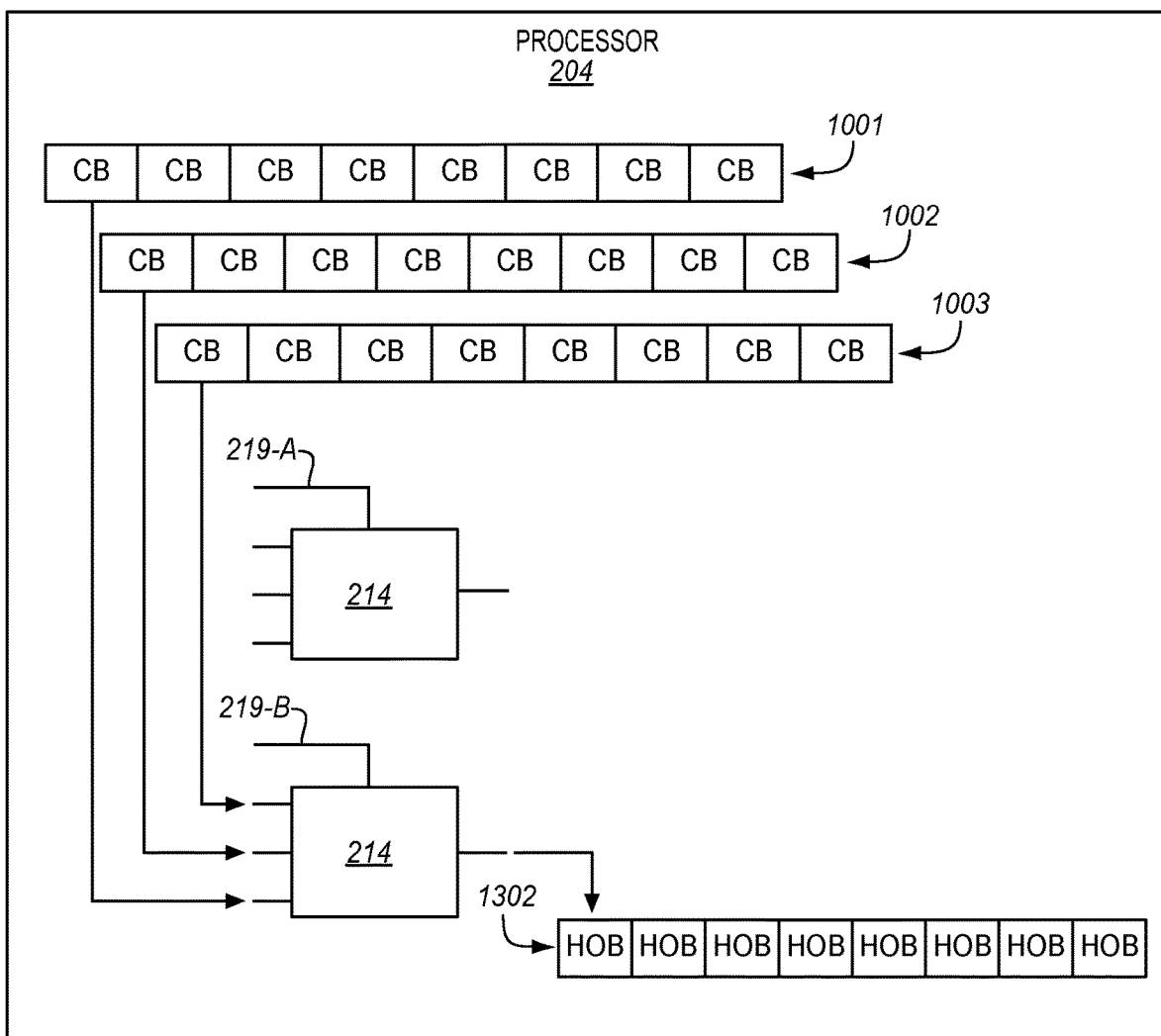

FIGS. 13-14 illustrate ternary logic operations in an illustrative embodiment. In FIG. 13, processor 204 performs a first ternary logic operation with the first set 1001 of comparison bits, the second set 1002 of comparison bits, and the third set 1003 of comparison bits as input. The first ternary logic operation outputs a set 1301 of low-order bits (LOB) for the block 800 of the pixels 702. In FIG. 14, processor 204 performs a second ternary logic operation with the first set 1001 of comparison bits, the second set 1002 of comparison bits, and the third set 1003 of comparison bits as input. The second ternary logic operation outputs a set 1302 of higher-order bits (HOB) for the block 800 of the pixels 702. For a two-bit halftoning process, the set 1302 of higher-order bits (HOB) represents the most-significant bits of the pixel values. Although not explicitly shown in FIGS. 13-14, processor 204 may perform a ternary logic operation on each of the comparison bits in sets 1001-1003 at the same time (e.g., same clock cycle). Also, although the ternary logic operations are shown in different figures, it is understood that the ternary logic operations may be performed simultaneously within processor 204.

Figures 15, 16:
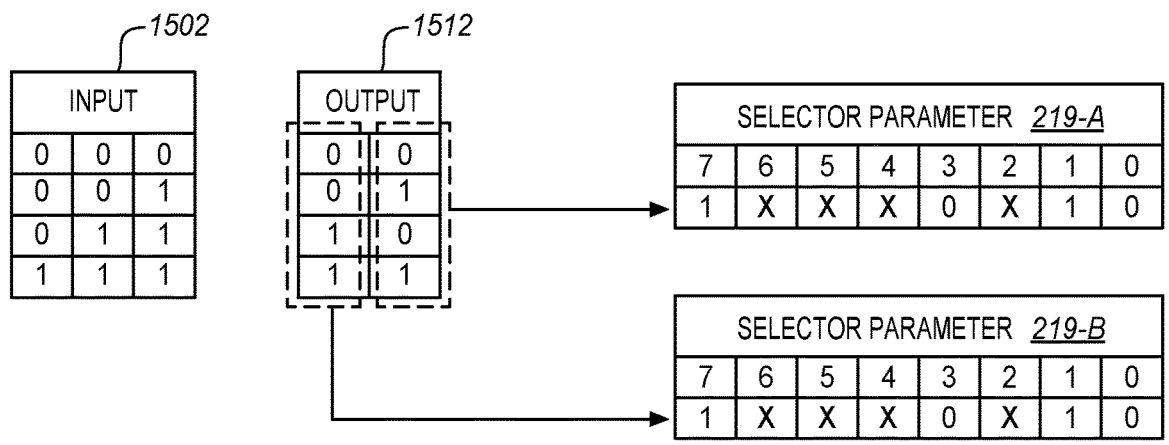
FIG. 15 illustrates computing of selector parameters in an illustrative embodiment.
FIGS. 16-17 illustrate bit planes that define pixel values for a halftoned image in an illustrative embodiment.

As stated above, there may be 256 possible ternary logic functions defined for ternary logic subsystems 214. The selector parameters 219-A/219-B are computed for ternary logic subsystems 214 to select the desired ternary logic functions for each bit plane. A selector parameter may be thought of as a lookup table. The three input bits form a number i between zero and seven. The $i^{th}$ bit of the selector parameter gives the output bit for the case of input i. FIG. 15 illustrates computing of selector parameters 219-A/219-B in an illustrative embodiment. The input table 1502 represents comparison bits arranged from right to left, such as from sets 1001-1003. The comparison bits resulting from the smallest threshold are on the right, and comparison bits resulting from the largest threshold are on the left. These bits are interpreted as a binary number between zero and seven. Not all numbers between zero and seven are needed for well-designed halftone threshold arrays, since the thresholds for smaller droplets/dots are always exceeded when the threshold for larger droplets/dots is exceeded. Accordingly, if there are four intensity levels, then the values that appear in input table 1502 are zero, one, three, and seven (i.e., "000", "001", "011", and "111"). Output table 1512 indicates the pixel value or pixel symbol desired when the input bits are as shown in input table 1502. For example, an input of "000" may be mapped to a pixel value of "00", an input of "001" may be mapped to a pixel value of "01", an input of "011" may be mapped to a pixel value of "10", and an input of "111" may be mapped to a pixel value of "11". However, any pixel value may be mapped to each possible set of input bits.

To compute a selector parameter 219-A for the first bit plane (i.e., for the low-order bits), we use the rightmost column of the output table 1512. Selector parameter 219-A is an eight-bit value. According to the rightmost column, a value of "0" is mapped to an input of "000" (decimal value 0), so bit zero of the selector parameter 219-A is set to "0". A value of "1" is mapped to an input of "001" (decimal value 1), so bit one of the selector parameter 219-A is set to "1". A value of "0" is mapped to an input of "011" (decimal value 3), so bit three of the selector parameter 219-A is set to "0". A value of "1" is mapped to an input of "111" (decimal value 7), so bit seven of the selector parameter 219-A is set to "1". The other bits of the selector parameter 219-A are set to a "don't care" value ("X"). Since the corresponding input bit patterns do not occur in well-designed halftone threshold arrays, these values will have no effect on the halftoned image. They may be thought of as values that will appear in the case of an error in the threshold array.

To compute a selector parameter 219-B for the second bit plane (i.e., for higher-order bits), we use leftmost column of the output table 1512. According to the leftmost column, a value of "0" is mapped to an input of "000" (decimal value 0), so bit zero of the selector parameter 219-B is set to "0". A value of "0" is mapped to an input of "001" (decimal value 1), so bit one of the selector parameter 219-B is set to "0". A value of "1" is mapped to an input of "011" (decimal value 3), so bit three of the selector parameter 219-B is set to "1". A value of "1" is mapped to an input of "111" (decimal value 7), so bit seven of the selector parameter 219-B is set to "1". The other bits of the selector parameter 219-B are set to a "don't care" value ("X").

The ternary logic operations output a set 1301 of low-order bits (LOB) for the block 800 of pixels 702, and a set 1302 of higher-order bits (HOB) for the block 800 of pixels 702. Processor 204 may repeat the multi-level halftoning process on multiple blocks of pixels 702 defined within raster image 220 in a similar manner. For example, if there is a determination (step 617) that the multi-level halftoning process is performed on additional blocks 800 of pixels 702, then method 600 returns to step 608 to identify a set of pixel values for another block 800 of pixels 702.

Processor 204 is configured to generate a plurality of bit planes 224 representing the pixel values for halftoned image 222. For example, a two-bit (four level) output includes two bit planes: one for the low-order bits, and one for the higher-order bits of each pixel. In FIG. 6B, processor 204 arranges one or more sets 1301 of the low-order bits in a first bit plane (step 618). The first bit plane therefore represents the low-order bits for the pixels of halftoned image 222. Processor 204 also arranges one or more sets 1302 of the higher-order bits in a second bit plane (step 620). The second bit plane may therefore represent the next higher-order bits for the pixels of halftoned image 222. Processor 204 may arrange one or more additional bit planes depending on the number of bits used to define pixels values in halftoned image 222.

Figure 17:
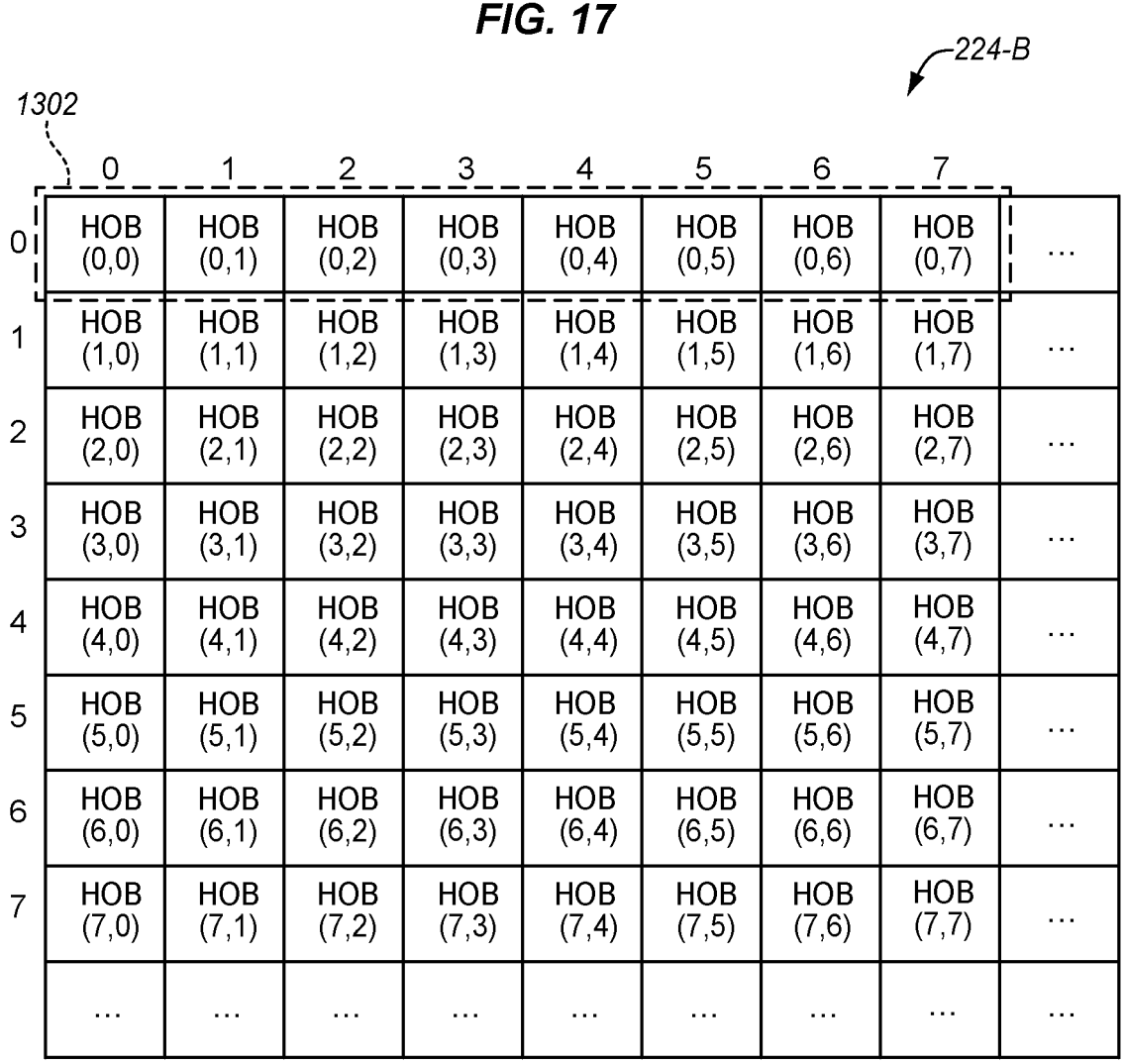

FIGS. 16-17 illustrate bit planes that define pixel values for halftoned image 222 in an illustrative embodiment. FIG. 16 illustrates the first bit plane 224-A representing the low-order bits (LOB) for one or more blocks of pixels. A bit plane is a data structure that represents one bit of a multi-bit pixel value (PV) for an array of pixels 702. When processor 204 performs the first ternary logic operation (step 614), it generates a set 1301 of low-order bits (LOB) for a block 800 of pixels 702. Processor 204 arranges the set 1301 of low-order bits in bit plane 224-A so that each of the low-order bits defines part of a pixel value for its corresponding pixel. For example, set 1301 includes the low-order bits for pixels (0,0), (0,1), (0,2), etc. The low-order bits are illustrated as being arranged in rows and columns to depict how the low-order bits correspond to pixels. However, a bit plane may have any desired structure that maps low-order bits to pixels. Processor 204 may arrange multiple sets 1301 of low-order bits in bit plane 224-A for multiple blocks 800. Thus, bit plane 224-A may include the low-order bits for pixels corresponding with a portion of a sheetside, a logical page on an N-up sheetside, a full sheetside, etc. Typically, pages to be imaged are combined into logical "sheetsides" that consist of one or more logical pages of equal length which when laid out for printing, span the width of the print web. The sheetside represents the image to be printed on a side of a sheet (or equivalent) of recording medium 132. FIG. 17 illustrates the second bit plane 224-B representing the higher-order bits (HOB) for one or more blocks of pixels. When processor 204 performs the second ternary logic operation (step 616), it generates a set 1302 of higher-order bits (HOB) for a block 800 of pixels 702. Processor 204 arranges the set 1302 of higher-order bits in bit plane 224-B so that each of the higher-order bits defines part of a pixel value for its corresponding pixel. For example, set 1302 includes higher-order bits for pixels (0,0), (0,1), (0,2), etc. Processor 204 may arrange multiple sets 1302 of higher-order bits in bit plane 224-B for multiple blocks 800. Thus, bit plane 224-B may include higher-order bits for pixels corresponding with a portion of a sheetside, a logical page on an N-up sheetside, a full sheetside, etc. In one embodiment, each bit plane 224-A/224-B may include the bits of eight pixels in a byte.

Processor 204 may be configured to output bit planes 224 to print engine 120, print mechanism 126, or another subsystem. For example, print engine 120 may be configured to handle individual bit planes for a printing operation. Thus, processor 204 may initiate transmission of the bit planes (e.g., the first bit plane 224-A and the second bit plane 224-B) to a destination, such as print engine 120, print mechanism 126, or another subsystem (step 622). For example, when halftone system 140 is implemented in print controller 114 of DFE 110 (see FIG. 1), processor 204 may access print engine interface 116 to transmit the bit planes 224 over communication link 117 to print engine 120. Print engine 120 may then initiate printing operations based on the bit planes 224. When halftone system 140 is implemented in print engine controller 124 of print engine 120, processor 204 may transmit the bit planes 224 to print mechanism 126, or to another subsystem within print engine controller 124 for further processing.

In another embodiment, processor 204 may be configured to output a halftoned image 222. In this case, processor 204 may perform an interleave operation to merge the bit planes 224 of halftoned image 222 (step 624). FIG. 18 illustrates halftoned image 222 with bit planes 224-A/224-B merged in an illustrative embodiment. Halftoned image 222 is a data structure that represents an array of pixels with multi-bit pixel values (PV). The pixel values of halftoned image 222 are y-bit values, which are less than the x-bit values used in raster image 220. The interleaving operation takes a higher-order bit (HOB) from bit plane 224-B, and a low-order bit (LOB) from bit plane 224-A to form the pixel values in halftoned image 222. Processor 204 may then initiate transmission of the halftoned image 222 to a destination, such as print engine 120, print mechanism 126, or another subsystem (step 626). For example, when halftone system 140 is implemented in print controller 114 of DFE 110 (see FIG. 1), processor 204 may access print engine interface 116 to transmit the halftoned image 222 over communication link 117 to print engine 120. Print engine 120 may then initiate printing operations based on the halftoned image 222. When halftone system 140 is implemented in print engine controller 124 of print engine 120, processor 204 may transmit the halftoned image 222 to print mechanism 126, or to another subsystem within print engine controller 124 for further processing.

The multi-level halftoning process described above is performed for a raster image 220 of a single color plane. For a CMYK color model, for example, method 600 may be repeated to halftone raster images for each of the color planes. An interleave operation as described above may also be performed on bit planes for multiple color planes. The interleaving of bits for each color plane can target the bit fields reserved for that color in a multi-color halftoned image. In this case, when the bits for each color planes are interleaved, all colors would then already be interleaved in the halftoned image.

Some of the examples provided above illustrate halftoning for four intensity levels. However, the concepts described herein apply to three intensity levels, five intensity levels, six intensity levels, or more. The case of three intensity levels is treated in a similar way as four intensity levels, except the third threshold is set to zero. For the case of eight intensity levels, there are seven thresholds. The comparison bits resulting from a comparison of the pixel values and a first threshold, a second threshold, and a third threshold may be input to a first ternary logic operation to output one bit plane. The comparison bits resulting from a comparison of the pixel values and a fifth threshold, a sixth threshold, and a seventh threshold may be input to a second ternary logic operation to output another bit plane. The comparison bits resulting from a comparison of the pixel values and a fourth threshold may be output to yet another bit plane (e.g., the most significant bit). The comparison of the fourth threshold may also be used to select which ternary logic result is written to the least significant bit plane. The cases of five to seven intensity levels may be treated the same eight intensity levels, except that the unused thresholds are treated as if they were zero.

Some of the concepts described above may be used to monitor usage of a recording material in image forming apparatus 100. In FIG. 1, print engine 120 is configured to mark recording medium 132 with a recording material 134 (e.g., ink, toner, etc.) based on the bit planes 224 generated by halftone system 140. As described above, the bit planes 224 in combination define the pixel values for pixels of a color plane. Based on a pixel value for an individual pixel, print engine 120 will produce a mark on recording medium 132 of a particular size, or will not produce a mark. Thus, in multi-level halftoning, there will be a plurality of pixel values that correspond with different drop sizes of recording material 134. The term "drop" refers to a quantity of recording material 134 used to produce a mark by print engine 120. Although the term "drop" commonly refers to a quantity of a print fluid, such as ink, it may also refer to other recording materials, such as toner. In the embodiment described below, drop counts may be calculated for each of the drop sizes for a sheetside, a print job, or portion thereof, for multiple print jobs, etc. For example, by processing the drop counts within print processing boundaries (e.g., sheetside boundaries, print job boundaries, portion boundaries, etc.), the drops counts for each of the drop sizes within a boundary may be determined. The drop counts may therefore be used to monitor the usage of the recording material 134.

Figure 19:
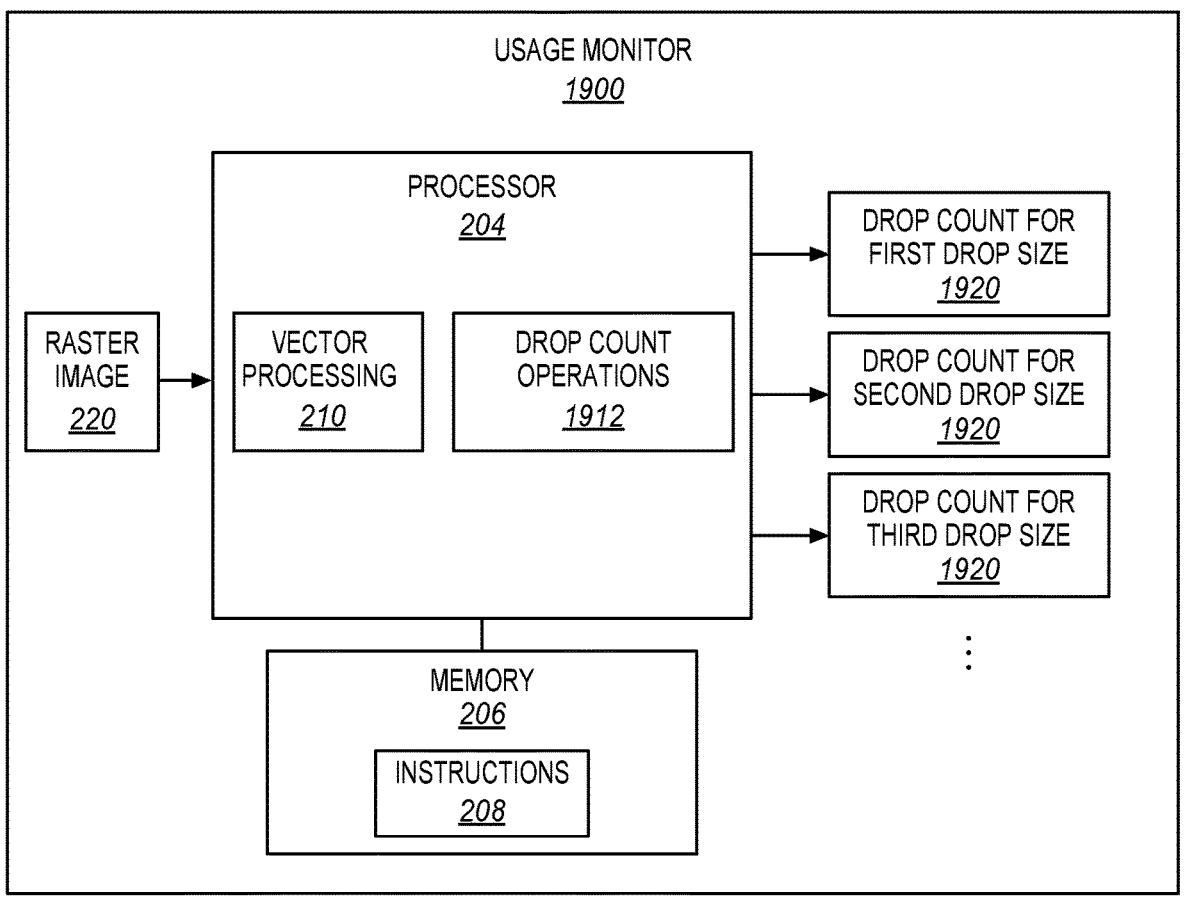
FIG. 19 is a schematic diagram of a usage monitor in an illustrative embodiment.

FIG. 19 is a schematic diagram of a usage monitor 1900 in an illustrative embodiment. Usage monitor 1900 comprises a system, circuitry, logic, hardware, and/or other components configured determine drop counts for different drop sizes, which is described in further detail below. Usage monitor 1900 may be implemented in print controller 114 of DFE 110 (see FIG. 1), in print engine controller 124, in a host system or another system coupled to image forming apparatus 100, or in other systems. For example, usage monitor 100 may be part of an ink estimator system that estimates ink usage for raster image 220 or print data 111 without the need for a print engine 120. Usage monitor 1900 may also be implemented in halftone system 140, as some of the processing performed by usage monitor 1900 overlaps the processing performed by halftone system 140 for a multi-level halftoning process. However, it is understood that usage monitor 1900 may be separate from halftone system 140 depending on desired implementations.

For this example, usage monitor 1900 may have a similar configuration as halftone system 140, with one or more processors 204 and a memory 206. Like with halftone system 140, processor 204 is configured for vector processing 210. For vector processing 210, processor 204 is configured to compare sets of pixel values from a raster image 220 with thresholds that are defined to distinguish different intensity levels. A comparison of a set of pixel values with a threshold results in a corresponding set of comparison bits. Processor 204 is also configured for drop count operations 1912. For the drop count operations 1912, processor 204 is configured to determine a number of set bits in the sets of comparison bits, and calculate a drop count 1920 for each drop size based on the number(s) of set bits found in the sets of comparison bits.

Figure 20:
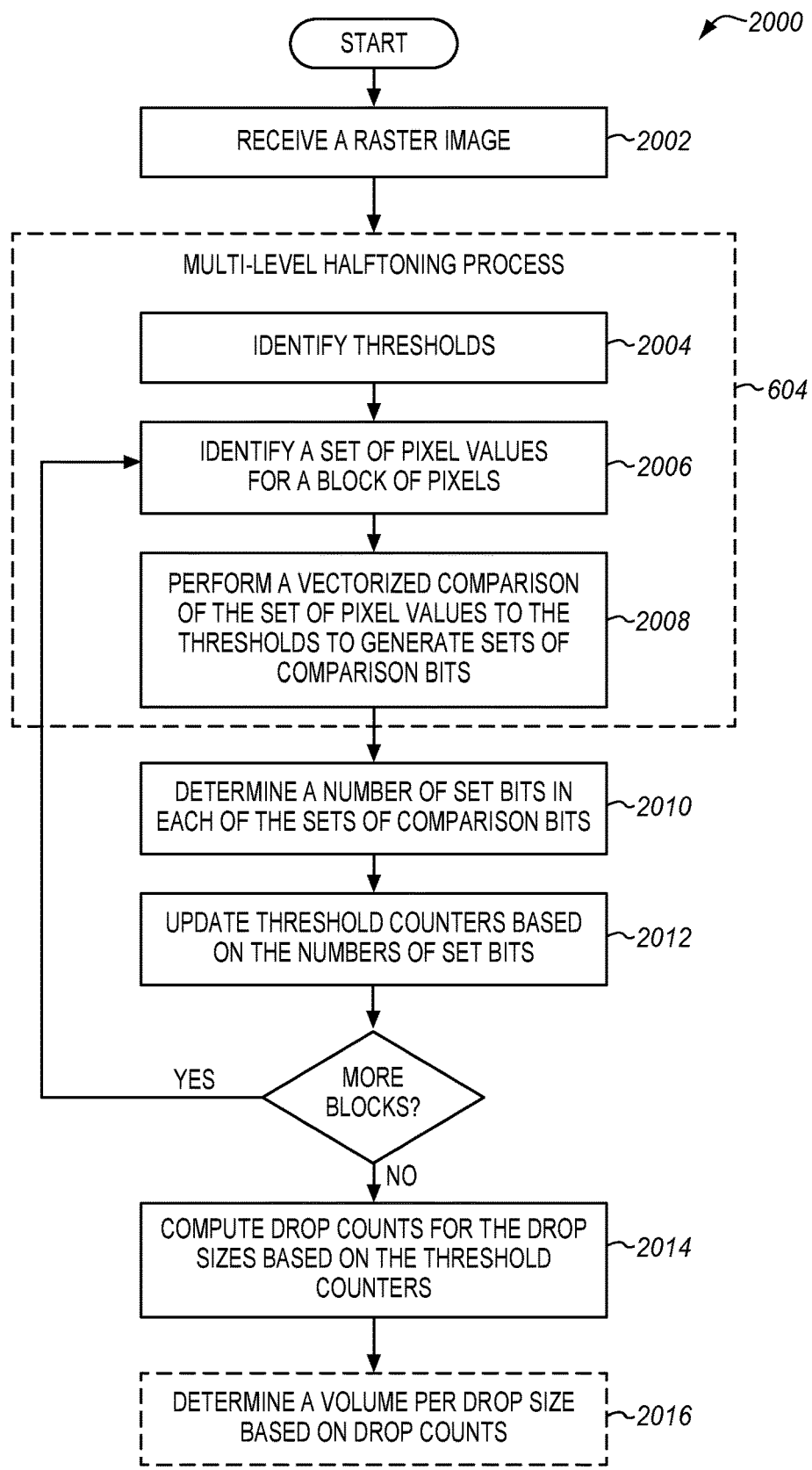
FIG. 20 is a flowchart illustrating a method of monitoring usage of a recording material in an illustrative embodiment.
Figure 21:
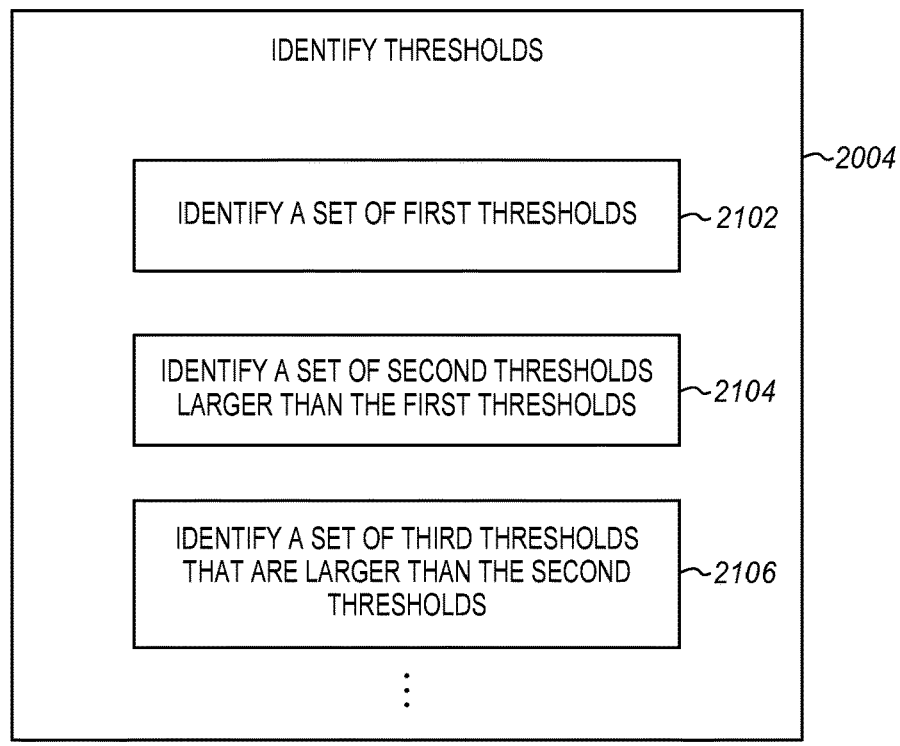
FIG. 21 shows steps of identifying thresholds in an illustrative embodiment.

FIG. 20 is a flowchart illustrating a method 2000 of monitoring usage of a recording material in an illustrative embodiment. The steps of method 2000 are described with reference to usage monitor 1900 in FIG. 19, but those skilled in the art will appreciate that method 2000 may be performed with other systems. In FIG. 20, processor 204 receives a raster image 220 (step 2002) for a color plane, such as generated by RIP 115 (see FIG. 7). Processor 204 also identifies thresholds for the multi-level reproduction (step 2004). As described above, multi-level reproduction involves multiple intensity levels, and therefore multiple thresholds that distinguish the different intensity levels. There is one less threshold than number of intensity levels. For example, a pixel represented by two bits may have four intensity levels (e.g., 00, 01, 10, 11). In this two-bit example with four intensity levels, there are three thresholds that distinguish or divide the four intensity levels. Thus, as shown in FIG. 21, processor 204 may identify at least a set 911 of first thresholds (step 2102), a set 912 of second thresholds that are larger than the first thresholds (step 2104), and a set 913 of third thresholds that are larger than the second thresholds (step 2106).

Figure 22:
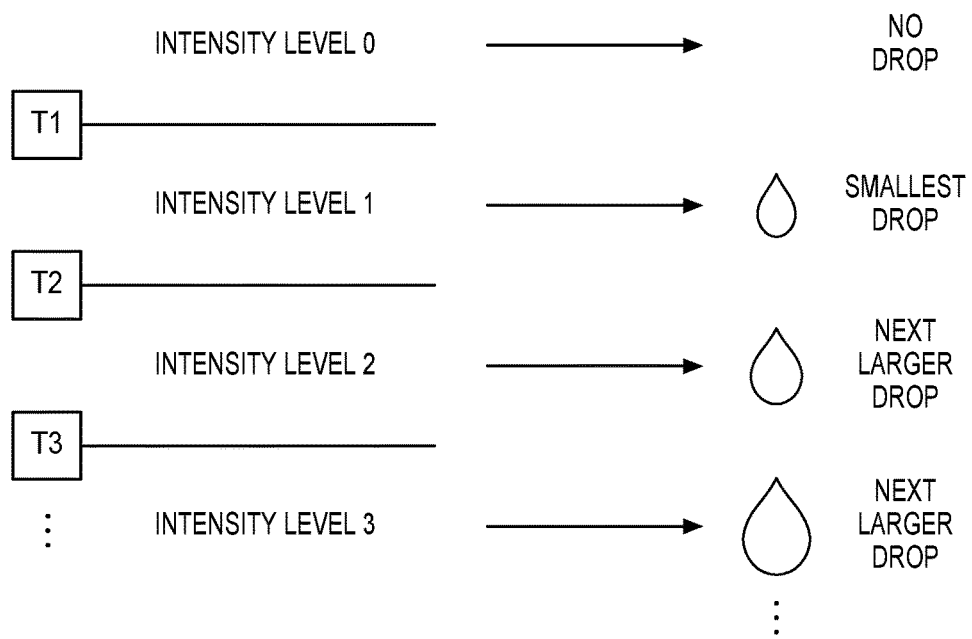
FIG. 22 illustrates a relationship between thresholds and drop size in an illustrative embodiment.

FIG. 22 illustrates a relationship between thresholds and drop size in an illustrative embodiment. In this example, the first threshold T1 is defined to distinguish intensity level "0" from intensity level "1", the second threshold T2 is defined to distinguish intensity level "1" from intensity level "2, the third threshold T3 is defined to distinguish intensity level "2" from intensity level "3", etc. Thus, if a pixel value is less than the first threshold T1, then that pixel value is mapped to intensity level "0". If a pixel value is between the first threshold T1 and the second threshold T2, then that pixel value is mapped to intensity level "1". If a pixel value is between the second threshold T2 and the third threshold T3, then that pixel value is mapped to intensity level "2". If a pixel value is greater than the third threshold T3, then that pixel value is mapped to intensity level "3".

Further, the intensity levels in FIG. 22 may be further mapped to drop sizes. For example, intensity level "0" may be mapped to no drop, intensity level "1" may be mapped to the smallest drop size, intensity level "2" may be mapped to the next larger drop size, intensity level "3" may be mapped to the next larger drop size, etc.

Figure 23:
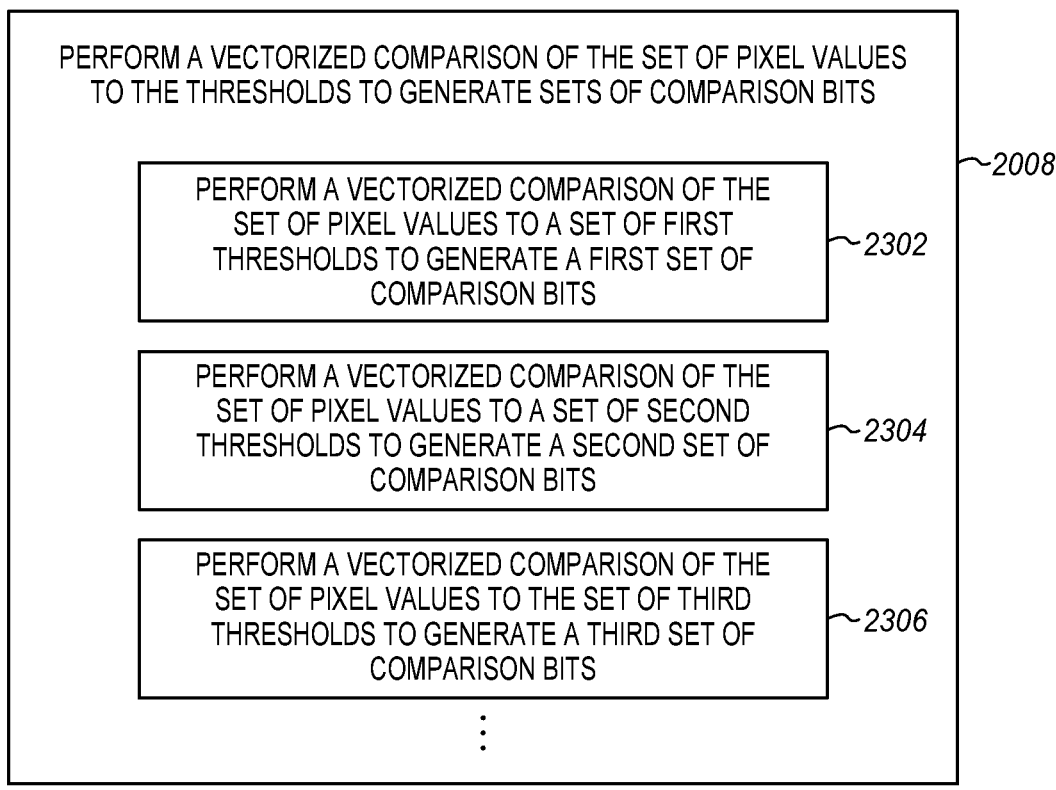
FIG. 23 shows steps of performing a vectorized comparison in an illustrative embodiment.

In FIG. 20, processor 204 operates on blocks of pixels at a time from raster image 220. Thus, processor 204 identifies a set of pixel values (PV) for pixels 702 in a block 800 (step 2006), such as is shown in FIG. 8. Processor 204 performs a vectorized comparison of the set 902 of pixel values (PV) to the thresholds in sets 911-913 (step 2008), such as is shown in FIGS. 10-12. Thus, as shown in FIG. 23, processor 204 may perform at least the following: a vectorized comparison of the set 902 of pixel values to the set 911 of first thresholds to generate a first set 1001 of comparison bits (step 2302), a vectorized comparison of the set 902 of pixel values to the set 912 of second thresholds to generate a second set 1002 of comparison bits (step 2304), and a vectorized comparison of the set 902 of pixel values to the set 913 of third thresholds to generate a third set 1003 of comparison bits (step 2306). As shown in FIG. 20, steps 2004, 2006, and 2008 of method 2000 may be part of a multi-level halftoning process 604 as described above in FIG. 6A.

Figure 24:
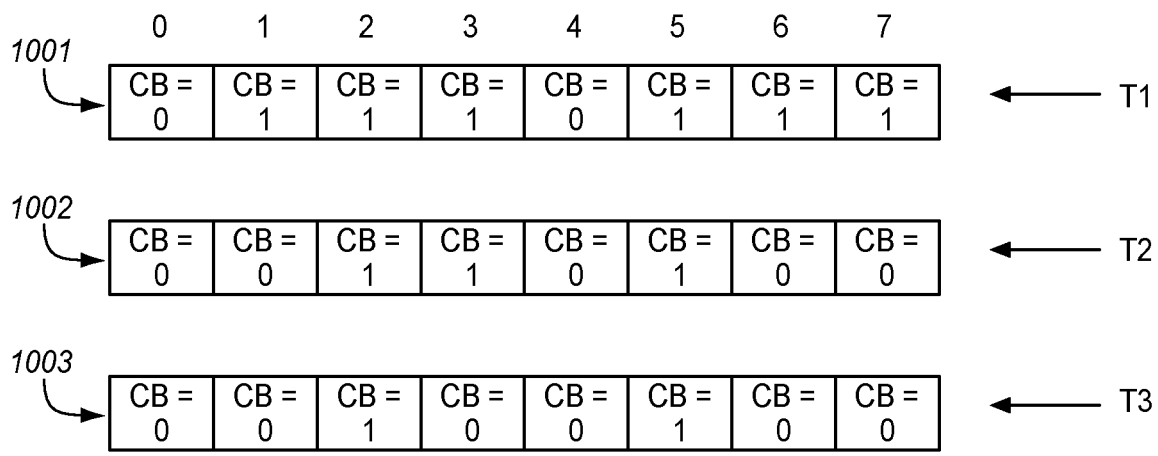
FIG. 24 illustrates sets of comparison bits in an illustrative embodiment.
Figure 25:
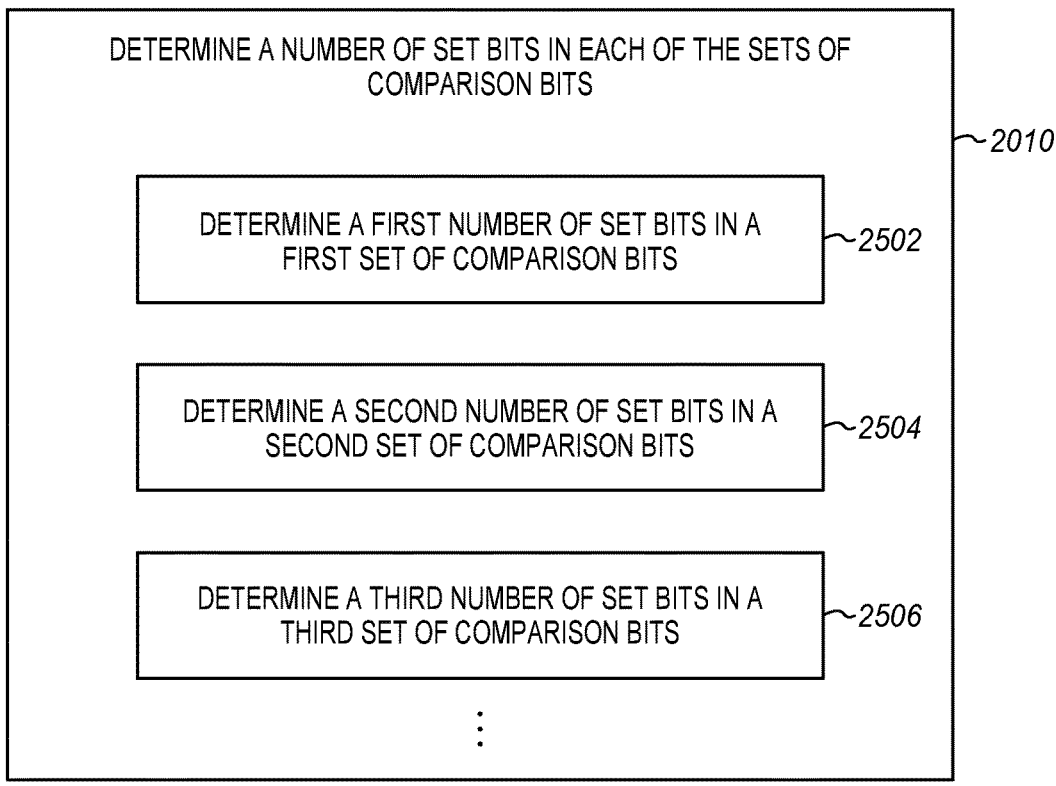
FIG. 25 shows steps of determining a number of set bits in sets of comparison bits in an illustrative embodiment.

The comparisons described above result in sets 1001-1003 of comparison bits. In FIG. 20, processor 204 determines a number of set bits in each of the sets 1001-1003 of comparison bits (step 2010). A comparison bit indicates whether or not a particular pixel value within set 902 exceeds a threshold. Thus, a set of comparison bits indicates how many of the pixel values in set 902 exceeds one of the thresholds. FIG. 24 illustrates sets 1001-1003 of comparison bits in an illustrative embodiment. In this example, the first set 1001 of comparison bits resulted from a comparison of the pixel values to the first threshold T1, the second set 1002 of comparison bits resulted from a comparison of the pixel values to the second threshold T2, and the third set 1003 of comparison bits resulted from a comparison of the pixel values to the third threshold T3. A "set bit" is a bit that is set high, such as to "1". In this example, bits 1-3 and 5-7 in the first set 1001 of comparison bits are set to "1", so there are six set bits in the first set 1001 of comparison bits. Bits 2-3 and 5 in the second set 1002 of comparison bits are set to "1", so there are three set bits in the second set 1002 of comparison bits. Bits 2 and 5 in the third set 1003 of comparison bits are set to "1", so there are two set bits in the third set 1003 of comparison bits. Thus, as shown in FIG. 25, processor 204 may at least determine a first number of set bits in the first set 1001 of comparison bits (step 2502), determine a second number of set bits in the second set 1002 of comparison bits (step 2504), and determine a third number of set bits in the third set 1003 of comparison bits (step 2506).

Figure 26:
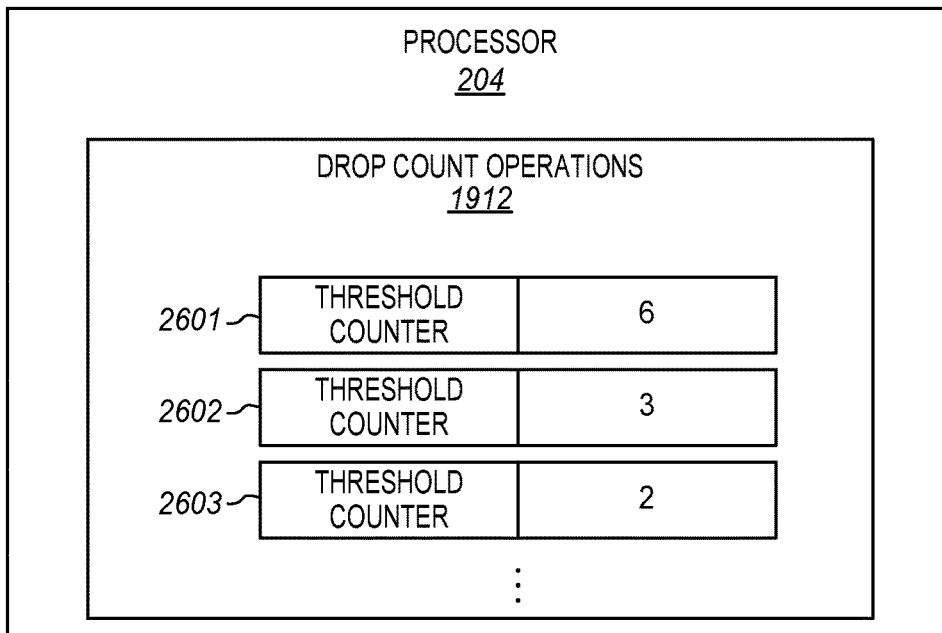
FIG. 26 is a schematic diagram of a processor with threshold counters in an illustrative embodiment.
Figure 27:
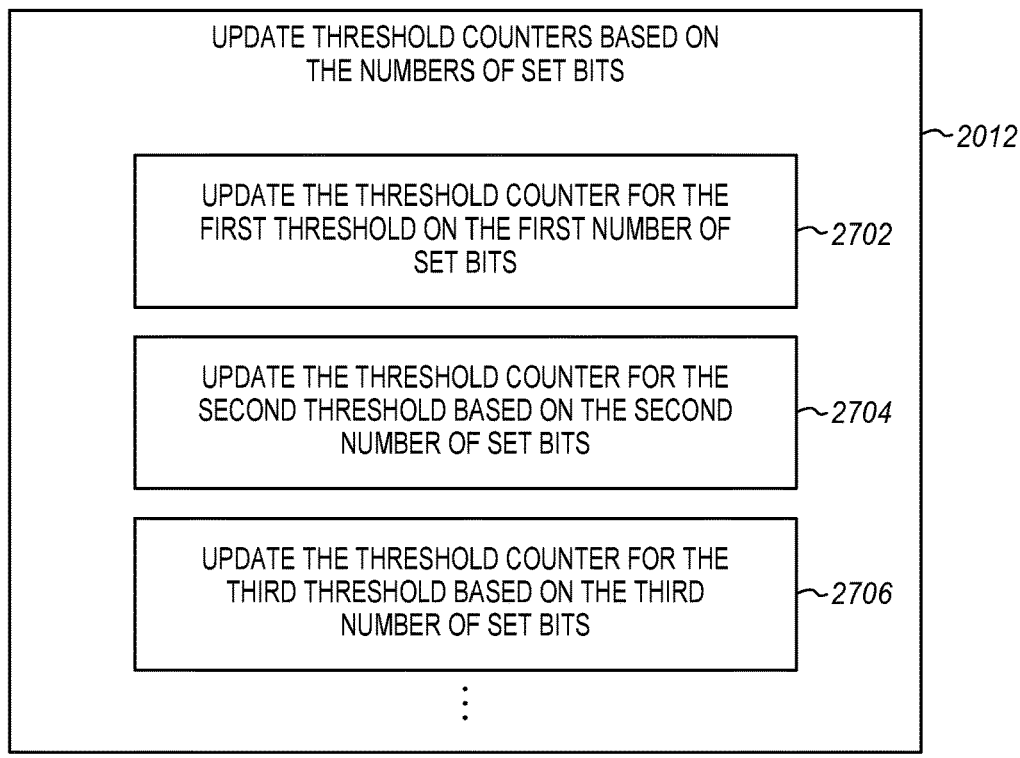
FIG. 27 shows steps of updating threshold counters in an illustrative embodiment.

Processor 204 may maintain a threshold counter for each of thresholds. FIG. 26 is a schematic diagram of processor 204 with threshold counters in an illustrative embodiment. Processor 204 maintains a threshold counter 2601 for the first threshold T1, a threshold counter 2602 for the second threshold T2, a threshold counter 2603 for the third threshold T3, etc. Processor 204 uses threshold counters 2601-2603 to accumulate the number of pixel values that exceed the thresholds over one or more blocks 800 of pixels 702. Thus, in FIG. 20, processor 204 updates threshold counters 2601-2603 based on the number of set bits determined for a corresponding one of the sets 1001-1003 of comparison bits (step 2012). For example, as shown in FIG. 27, processor 204 may at least update the threshold counter 2601 for the first threshold based on the first number of set bits (step 2702), update the threshold counter 2602 for the second threshold based on the second number of set bits (step 2704), and update the threshold counter 2603 for the third threshold based on the third number of set bits (step 2706).

In FIG. 26, when the first set 1001 of comparison bits corresponds with the first threshold T1, processor 204 may update threshold counter 2601 by adding the first number of set bits found in the first set 1001 of comparison bits to the present count maintained in threshold counter 2601. When the second set 1002 of comparison bits corresponds with the second threshold T2, processor 204 may update threshold counter 2602 by adding the second number of set bits found in the second set 1002 of comparison bits to the present count maintained in threshold counter 2602. When the third set 1001 of comparison bits corresponds with the third threshold T3, processor 204 may update threshold counter 2603 by adding the third number of set bits found in the third set 1003 of comparison bits to the present count maintained in threshold counter 2603. For the example shown in FIG. 24, processor 204 may add a value of "6" to the threshold counter 2601 associated with the first threshold T1 (see FIG. 26), may add the value of "3" to the threshold counter 2602 associated with the second threshold T2, and may add the value of "2" to the threshold counter 2603 associated with the third threshold T3.

Processor 204 may then repeat the above process for multiple blocks 800 of pixels 702 from raster image 220. Thus, processor 204 may accumulate a total of the number of set bits encountered for each of the thresholds over a plurality of blocks 800 of pixels 702. For example, processor 204 may accumulate data in the threshold counters 2601-2603 over a portion of a sheetside, a full sheetside, a print job, multiple print jobs, etc.

Figure 28:
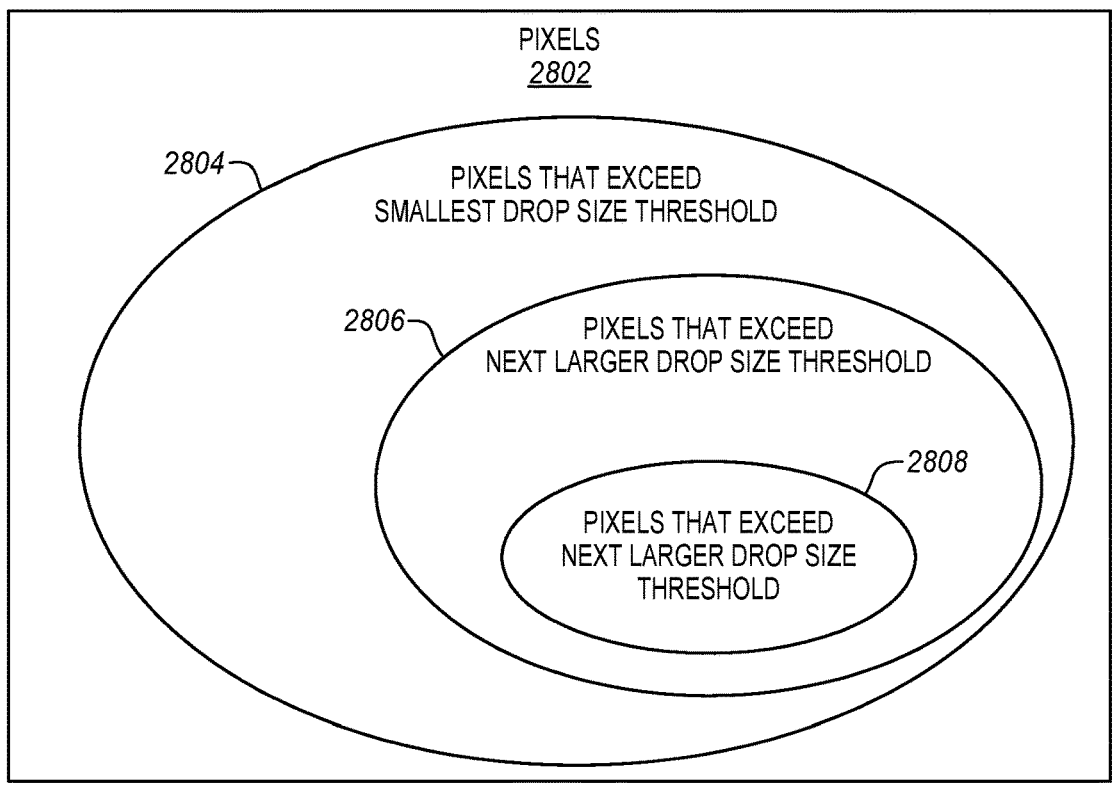
FIG. 28 is a set diagram showing the relationship between pixels of the different drop sizes in an illustrative embodiment.

In FIG. 20, processor 204 computes drop counts 1920 for each of the drop sizes based on the threshold counters 2601-2603 (step 2014). In a well-formed halftone design, for example, thresholds for larger drop sizes are always greater than or equal to thresholds for smaller drops sizes in the same location and color plane. Using set theory, the number of times each drop size occurs is the number of pixel values that exceed the threshold for that drop size, less the number of pixel values that exceed the threshold for the next larger drop. Also, the number of zero drops is the total number of pixels less the number of pixel values that exceed the threshold for the smallest drop size. FIG. 28 is a set diagram showing the relationship between pixels of the different drop sizes corresponding to an image in an illustrative embodiment. Within the set 2802 of pixels shown in FIG. 28, there is a subset 2804 of pixels having pixel values that exceed the threshold for the smallest drop size. For example, if the threshold for the smallest drop size is "64" (decimal), then each pixel in subset 2804 has a pixel value that exceeds this threshold. Within subset 2804 of pixels, there is another subset 2806 of pixels having pixel values that exceed the threshold for the next larger drop size. For example, if the threshold for the next larger drop size is "128" (decimal), then each pixel in subset 2806 has a pixel value that exceeds this threshold. Within subset 2806 of pixels, there is another subset 2808 of pixels having pixel values that exceed the threshold for the next larger drop size. For example, if the threshold for the next larger drop size is "192" (decimal), then each pixel in subset 2808 has a pixel value that exceeds this threshold. As is evident in FIG. 28, the number of times the smallest drop size (e.g. the smallest non-zero drop size) occurs is the number of pixels within subset 2804 less the number of pixels within subset 2806. Likewise, the number of times the next larger drop size occurs is the number of pixels within subset 2806 less the number of pixels within subset 2808. Similarly, the number of times zero drop size occurs (e.g., no recording material 134 is intended to be marked) is the number of pixels within set 2802 less the number of pixels within subset 2804. This set theory may be used to compute drop counts 1920 for each of the drop sizes based on the threshold counters 2601-2603.

Figure 29:
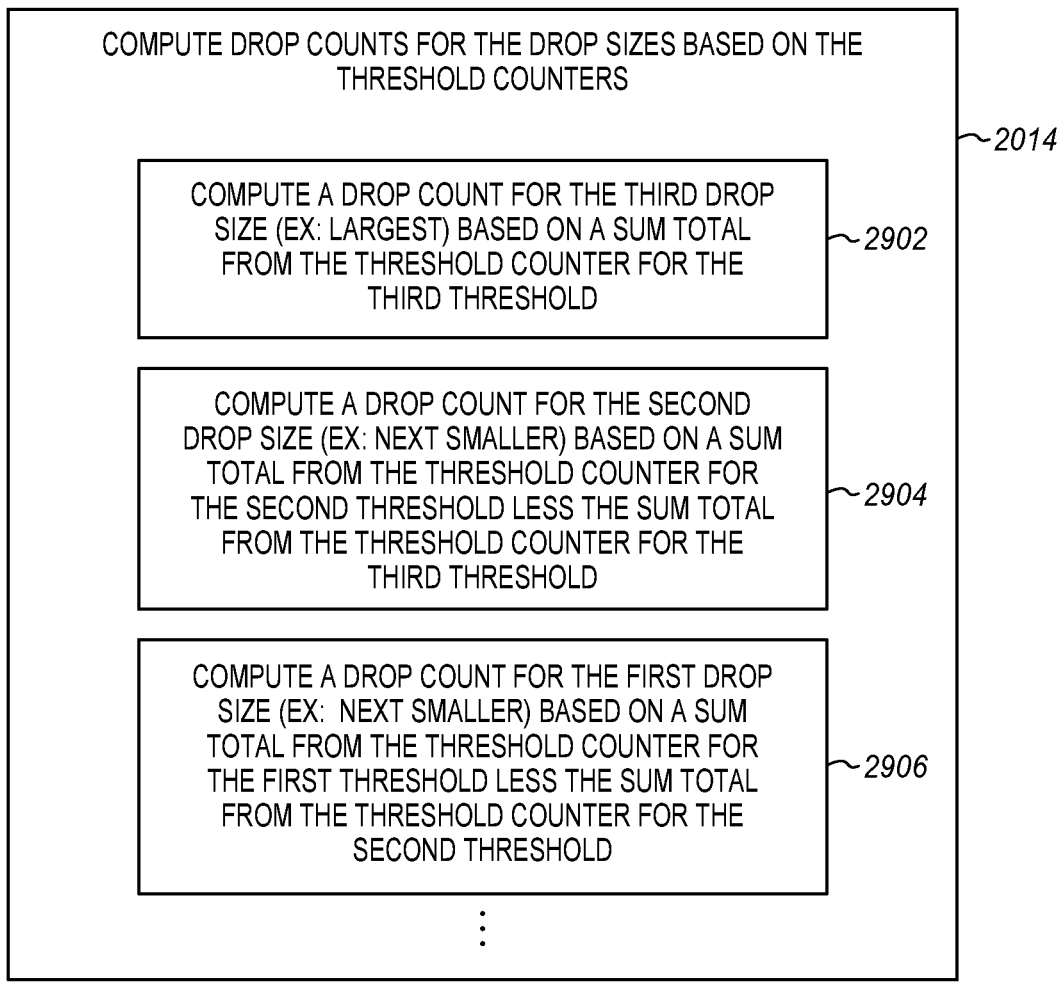
FIG. 29 shows steps of computing drop counts for drop sizes based on threshold counters in an illustrative embodiment.

For example, in FIG. 29, processor 204 may compute a drop count for the third drop size based on a sum total (e.g., sum total count value) from the threshold counter 2603 for the third threshold T3 (step 2902). Thus, the drop count for the third drop size equals the sum total from threshold counter 2603, such as when the third drop size is the largest drop size. For example, if the sum total of threshold counter 2603 is "12,000", then the drop count for the third drop size equals "12,000". Processor 204 may compute a drop count for the second drop size, which is the next smallest size, based on a sum total from threshold counter 2602 for the second threshold T2 less the sum total from threshold counter 2603 for the third threshold T3 (step 2904). For example, if the sum total of threshold counter 2602 is "26,000", then the drop count for the second drop size is "26,000 minus 12,000", which equals "14,000". Processor 204 may compute a drop count for the first drop size, which is the next smallest size, based on a sum total from threshold counter 2601 for the first threshold T1 less the sum total from threshold counter 2602 for the second threshold T2 (step 2906). For example, if the sum total of threshold counter 2601 is "60,000", then the drop count for the first drop size is "60,000 minus 26,000", which equals "34,000". If the first drop size is not the smallest, similar computations may occur until a drop count is calculated for the smallest drop size.

After step 2014 in FIG. 20, a drop count 1920 is determined for each of the drop sizes (e.g., non-zero drops sizes) of a color plane. Additionally, a drop count for zero drop sizes of a color plane may also be determined. The drop counts 1920 may be for a portion of a sheetside, a full sheetside, multiple sheetsides, a print job, multiple print jobs, etc. Usage monitor 1900 may then output the drop counts 1920 per drop size and per color plane as desired. For example, usage monitor 1900 may display the drop counts 1920 to a human operator, such as through GUI 118 (see FIG. 1), may store the drop counts 1920 in a file, where they could be printed out or displayed at a later time either automatically or on demand by the human operator, etc. Usage monitor 1900 may alternatively or additionally transmit the drop counts 1920 and corresponding information (e.g., time, date, sheetside, print job, etc.) to an external system over a network, such as through I/O interface 112. The above process may be repeated to compute drop counts 1920 for each of multiple color planes.

In one embodiment, usage monitor 1900 may process the drop counts 1920 to calculate additional output. For example, processor 204 may determine a total amount of recording material 134 (e.g., mass or volume) per color plane based on the drop counts 1920 and estimated amounts (e.g., mass or volume) of recording material 134 for each of the drop sizes for each of the color planes according to optional step 2016. Processor 204 may determine a total amount of recording material 134 consumed over a period of time or for printing of a portion of a sheetside, a full sheetside, a print job, multiple print jobs, etc.

Figure 30:
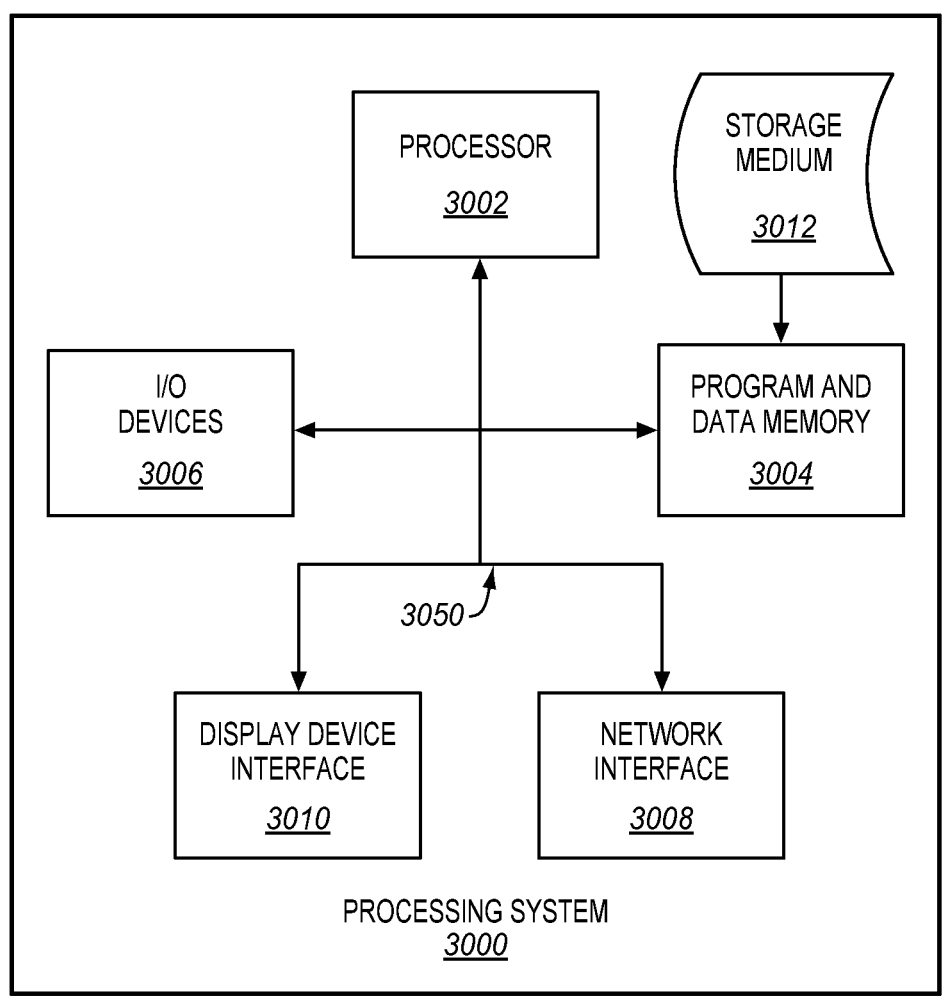
FIG. 30 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of the image forming apparatus 100 to perform the various operations disclosed herein. FIG. 30 illustrates a processing system 3000 operable to execute a computer readable medium embodying programmed instructions to perform desired functions in an illustrative embodiment. Processing system 3000 is operable to perform the above operations by executing programmed instructions tangibly embodied on computer readable storage medium 3012. In this regard, embodiments can take the form of a computer program accessible via computer-readable medium 3012 providing program code for use by a computer or any other instruction execution system. For the purposes of this description, computer readable storage medium 3012 can be anything that can contain or store the program for use by the computer.

Computer readable storage medium 3012 can be an electronic, magnetic, optical, electromagnetic, infrared, or semiconductor device. Examples of computer readable storage medium 3012 include a solid-state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 3000, being suitable for storing and/or executing the program code, includes at least one processor 3002 coupled to program and data memory 3004 through a system bus 3050. Program and data memory 3004 can include local memory employed during actual execution of the program code, bulk storage, and cache memories that provide temporary storage of at least some program code and/or data in order to reduce the number of times the code and/or data are retrieved from bulk storage during execution.

I/O devices 3006 (including but not limited to keyboards, displays, pointing devices, etc.) can be coupled either directly or through intervening I/O controllers. Network adapter interfaces 3008 may also be integrated with the system to enable processing system 3000 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 3010 may be integrated with the system to interface to one or more display devices, such as printing systems and screens for presentation of data generated by processor 3002.

Although specific embodiments are described herein, the scope of the disclosure is not limited to those specific embodiments. The scope of the disclosure is defined by the following claims and any equivalents thereof.

What is claimed is:

1. A usage monitor, comprising:
at least one processor; and
a memory including computer program code executable by the processor to cause the usage monitor to:
receive a raster image comprising an array of pixels;
identify thresholds that distinguish different intensity levels reproduced by different drop sizes of a recording material;
for each block of one or more blocks of the pixels:
identify a set of pixel values for the block of the pixels;
perform a vectorized comparison of the set of pixel values to each of the thresholds to generate sets of comparison bits, wherein each of the sets of comparison bits corresponds with one of the thresholds and indicates the pixel values that exceed the one of the thresholds;
determine a number of set bits in each of the sets of comparison bits; and
update a threshold counter for each of the thresholds based on the number of set bits determined for a corresponding one of the sets of comparison bits; and
compute drop counts for the drop sizes based on the threshold counter for each of the thresholds.

2. The usage monitor of claim 1 wherein the processor further causes the usage monitor to:
perform a vectorized comparison of the set of pixel values and a first one of the thresholds to generate a first set of comparison bits;
perform a vectorized comparison of the set of pixel values and a second one of the thresholds to generate a second set of comparison bits, wherein the second one of the thresholds is greater than the first one of the thresholds; and
perform a vectorized comparison of the set of pixel values and a third one of the thresholds to generate a third set of comparison bits, wherein the third one of the thresholds is greater than the second one of the thresholds.

3. The usage monitor of claim 2 wherein the processor further causes the usage monitor to:
determine a first number of set bits in the first set of comparison bits;
determine a second number of set bits in the second set of comparison bits;
determine a third number of set bits in the third set of comparison bits;
update a threshold counter for the first one of the thresholds based on the first number of set bits;
update a threshold counter for the second one of the thresholds based on the second number of set bits; and
update a threshold counter for the third one of the thresholds based on the third number of set bits.

4. The usage monitor of claim 3 wherein:
the drop sizes include at least a first drop size, a second drop size, and a third drop size; and
the processor further causes the usage monitor to:
compute a drop count for the third drop size based on a sum total from the threshold counter for the third one of the thresholds;
compute a drop count for the second drop size based on a sum total from the threshold counter for the second one of the thresholds less the sum total from the threshold counter for the third one of the thresholds; and
compute a drop count for the first drop size based on a sum total from the threshold counter for the first one of the thresholds less the sum total from the threshold counter for the second one of the thresholds.

5. The usage monitor of claim 1 wherein the processor further causes the usage monitor to:
compute the drop counts for a full sheetside.

6. The usage monitor of claim 1 wherein the processor further causes the usage monitor to:
compute the drop counts over multiple sheetsides of a print job.

7. The usage monitor of claim 1 wherein the processor further causes the usage monitor to:
determine a volume for each of the drop sizes based on the drop counts.

8. The usage monitor of claim 1 wherein the processor further causes the usage monitor to:
perform the vectorized comparison of the set of pixel values and the thresholds as part of a multi-level halftoning process.

9. The usage monitor of claim 1 wherein:
the processor comprises a Central Processing Unit (CPU) with a Single Instruction Multiple Data (SIMD) architecture.

10. The usage monitor of claim 1 wherein:
the processor comprises a Graphical Processing Unit (GPU) with a Single Instruction Multiple Data (SIMD) architecture.

11. An image forming apparatus comprising:
the usage monitor of claim 1.

12. A method of monitoring usage of a recording material, the method comprising:
receiving a raster image comprising an array of pixels;
identifying thresholds that distinguish different intensity levels reproduced by different drop sizes of the recording material;
for each block of one or more blocks of the pixels:
identifying a set of pixel values for the block of the pixels;
performing a vectorized comparison of the set of pixel values to each of the thresholds to generate sets of comparison bits, wherein each of the sets of comparison bits corresponds with one of the thresholds and indicates the pixel values that exceed the one of the thresholds;
determining a number of set bits in each of the sets of comparison bits; and
updating a threshold counter for each of the thresholds based on the number of set bits determined for a corresponding one of the sets of comparison bits; and
computing drop counts for the drop sizes based on the threshold counter for each of the thresholds.

13. The method of claim 12 wherein performing the vectorized comparison comprises:
performing a vectorized comparison of the set of pixel values and a first one of the thresholds to generate a first set of comparison bits;
performing a vectorized comparison of the set of pixel values and a second one of the thresholds to generate a second set of comparison bits, wherein the second one of the thresholds is greater than the first one of the thresholds; and
performing a vectorized comparison of the set of pixel values and a third one of the thresholds to generate a third set of comparison bits, wherein the third one of the thresholds is greater than the second one of the thresholds.

14. The method of claim 13 wherein:
determining the number of set bits in each of the sets of comparison bits comprises:
determining a first number of set bits in the first set of comparison bits;
determining a second number of set bits in the second set of comparison bits; and
determining a third number of set bits in the third set of comparison bits; and
updating the threshold counter for each of the thresholds comprises:
updating a threshold counter for the first one of the thresholds based on the first number of set bits;
updating a threshold counter for the second one of the thresholds based on the second number of set bits; and
updating a threshold counter for the third one of the thresholds based on the third number of set bits.

15. The method of claim 14 wherein:
the drop sizes include at least a first drop size, a second drop size, and a third drop size; and
computing the drop counts comprises:
computing a drop count for the third drop size based on a sum total from the threshold counter for the third one of the thresholds;
computing a drop count for the second drop size based on a sum total from the threshold counter for the second one of the thresholds less the sum total from the threshold counter for the third one of the thresholds; and
computing a drop count for the first drop size based on a sum total from the threshold counter for the first one of the thresholds less the sum total from the threshold counter for the second one of the thresholds.

16. The method of claim 12 further comprising:
determining a volume for each of the drop sizes based on the drop counts.

17. A non-transitory computer readable medium embodying programmed instructions which, when executed by a processor, are operable for performing a method of monitoring usage of a recording material, the method comprising:
receiving a raster image comprising an array of pixels;
identifying thresholds that distinguish different intensity levels reproduced by different drop sizes of the recording material;
for each block of one or more blocks of the pixels:
identifying a set of pixel values for the block of the pixels;
performing a vectorized comparison of the set of pixel values to each of the thresholds to generate sets of comparison bits, wherein each of the sets of comparison bits corresponds with one of the thresholds and indicates the pixel values that exceed the one of the thresholds;
determining a number of set bits in each of the sets of comparison bits; and
updating a threshold counter for each of the thresholds based on the number of set bits determined for a corresponding one of the sets of comparison bits; and
computing drop counts for the drop sizes based on the threshold counter for each of the thresholds.

18. The computer readable medium of claim 17 wherein performing the vectorized comparison comprises:
performing a vectorized comparison of the set of pixel values and a first one of the thresholds to generate a first set of comparison bits;
performing a vectorized comparison of the set of pixel values and a second one of the thresholds to generate a second set of comparison bits, wherein the second one of the thresholds is greater than the first one of the thresholds; and
performing a vectorized comparison of the set of pixel values and a third one of the thresholds to generate a third set of comparison bits, wherein the third one of the thresholds is greater than the second one of the thresholds.

19. The computer readable medium of claim 18 wherein:
determining the number of set bits in each of the sets of comparison bits comprises:

determining a first number of set bits in the first set of comparison bits;
determining a second number of set bits in the second set of comparison bits; and
determining a third number of set bits in the third set of comparison bits; and updating the threshold counter for each of the thresholds comprises:
updating a threshold counter for the first one of the thresholds based on the first number of set bits;
updating a threshold counter for the second one of the thresholds based on the second number of set bits; and
updating a threshold counter for the third one of the thresholds based on the third number of set bits.

20. The computer readable medium of claim 19 wherein:
the drop sizes include at least a first drop size, a second drop size, and a third drop size; and
computing the drop counts comprises:
computing a drop count for the third drop size based on a sum total from the threshold counter for the third one of the thresholds;
computing a drop count for the second drop size based on a sum total from the threshold counter for the second one of the thresholds less the sum total from the threshold counter for the third one of the thresholds; and
computing a drop count for the first drop size based on a sum total from the threshold counter for the first one of the thresholds less the sum total from the threshold counter for the second one of the thresholds.

\* \* \* \* \*